US012187211B2

(12) United States Patent
Inami et al.

(10) Patent No.: US 12,187,211 B2
(45) Date of Patent: Jan. 7, 2025

(54) VEHICLE-BODY FRONT STRUCTURE THAT SUPPRESSES DEFORMATION OF A VEHICLE CABIN

(71) Applicant: Mazda Motor Corporation, Hiroshima (JP)

(72) Inventors: Takuma Inami, Hiroshima (JP); Nobuyuki Nakayama, Hiroshima (JP); Hiroyuki Baba, Hiroshima (JP); Mitsuru Wakabayashi, Hiroshima (JP); Koji Miyamoto, Hiroshima (JP); Masaki Motoki, Hiroshima (JP); Manabu Tatsuda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 314 days.

(21) Appl. No.: 17/941,024

(22) Filed: Sep. 9, 2022

(65) Prior Publication Data
US 2023/0099466 A1 Mar. 30, 2023

Related U.S. Application Data

(63) Continuation of application No. 17/938,946, filed on Sep. 7, 2022.
(Continued)

(30) Foreign Application Priority Data

Sep. 30, 2021 (JP) .................................. 2021-161834
Nov. 10, 2021 (JP) .................................. 2021-183320
(Continued)

(51) Int. Cl.
B62D 25/08 (2006.01)
B60R 19/18 (2006.01)
(Continued)

(52) U.S. Cl.
CPC .............. *B60R 19/34* (2013.01); *B60R 19/18* (2013.01); *B60R 19/52* (2013.01); *B62D 25/08* (2013.01);
(Continued)

(58) Field of Classification Search
CPC ......... B60R 19/34; B60R 19/12; B60R 19/24; B60R 2019/1806; B60R 2019/527;
(Continued)

(56) References Cited

U.S. PATENT DOCUMENTS 9,096,276 B2 * 8/2015 Komiya ................. B62D 21/11

FOREIGN PATENT DOCUMENTS

JP 2004-106808 A 4/2004
JP 2005-41395 A 2/2005
(Continued)

*Primary Examiner* — Dennis H Pedder
(74) *Attorney, Agent, or Firm* — XSENSUS LLP

(57) ABSTRACT

To suppress deformation of a vehicle cabin by efficiently absorbing an impact load obliquely from a vehicle front side, a vehicle-body front structure includes an upper-side cross member, a lower-side cross member, upper-side impact absorption members that support respective ones of both vehicle-width-direction sides of the upper-side cross member, and lower-side impact absorption members that support respective ones of both vehicle-width-direction sides of the lower-side cross member. The upper-side impact absorption members and the lower-side impact absorption members are each positioned farther on a vehicle-width-direction outer side at a position farther on a vehicle front side.

11 Claims, 12 Drawing Sheets

Related U.S. Application Data

(60) Provisional application No. 63/403,796, filed on Sep. 5, 2022.

(30) Foreign Application Priority Data

| Nov. 10, 2021 | (JP) | ................................. 2021-183325 |
| Nov. 10, 2021 | (JP) | ................................. 2021-183327 |
| Nov. 10, 2021 | (JP) | ................................. 2021-183331 |

(51) Int. Cl.
  *B60R 19/34* (2006.01)
  *B60R 19/52* (2006.01)

(52) U.S. Cl.
  CPC .... *B62D 25/082* (2013.01); *B60R 2019/1806* (2013.01); *B60R 2019/525* (2013.01); *B60R 2019/527* (2013.01)

(58) Field of Classification Search
  CPC .............. B60R 2019/247; B62D 25/08; B62D 25/085; B62D 25/082; B62D 25/2018; B62D 27/02; B62D 27/023
  USPC .... 296/203.01, 2, 187.09, 1, 29, 30, 193.09, 296/193.1; 293/102, 120–122
  See application file for complete search history.

(56) References Cited

FOREIGN PATENT DOCUMENTS

| JP | 2009-101815 A | 5/2009 |
| JP | 2018-52363 A | 4/2018 |
| JP | 2019-123461 A | 7/2019 |
| JP | 2019-177831 A | 10/2019 |
| JP | 2021-35789 A | 3/2021 |

* cited by examiner

VEHICLE-BODY FRONT STRUCTURE THAT SUPPRESSES DEFORMATION OF A VEHICLE CABIN

CROSS-REFERENCE TO RELATED APPLICATIONS

The present application is a continuation application of U.S. patent application Ser. No. 17/938,946, filed on Sep. 7, 2022, which claims priority to Provisional Ser. No. 63/403, 796, filed on Sep. 5, 2022, which claims benefit of Japanese Patent Application 2021-161834, filed Sep. 30, 2021, Japanese Patent Application 2021-183320, filed Nov. 10, 2021, Japanese Patent Application 2021-183325, filed Nov. 10, 2021, Japanese Patent Application 2021-183327, filed Nov. 10, 2021, Japanese Patent Application 2021-183331, filed Nov. 10, 2021, the entire contents of each of which are incorporated herein by reference.

TECHNICAL FIELD

The present disclosure relates to a vehicle-body front structure provided in an automobile.

BACKGROUND

For example, as disclosed in Patent Literature 1, a pair of right and left front-side frames extending in a vehicle front-rear direction on both vehicle-width-direction sides are provided at a vehicle-body front portion of an automobile. In Patent Literature 1, a subframe is connected on the lower side of the front-side frames. The subframe includes a closed-loop structure portion formed in a substantially parallelogram shape on each of the left side and the right side. Specifically, the closed-loop structure portion on the left side includes a front-side member extending in the vehicle width direction, an inner member and an outer member that are tilted inward in the vehicle width direction from respective ones of both end portions of the front-side member toward the vehicle rear side, and a rear-side member extending from a vehicle rear portion of the inner member to a vehicle rear portion of the outer member, and similarly, the closed-loop structure portion on the right side includes a front-side member, an inner member and an outer member, and a rear-side member.

[Patent Literature 1] Japanese Patent Laid-open No.

SUMMARY

Problems to be Solved

For example, it is assumed that an obstacle obliquely collides from the vehicle front side while an automobile is traveling. In this case, the subframe of Patent Literature 1 receives an impact load and undergoes pressurized breakdown, but since the subframe is provided only on the lower side of a front-side frame, the impact load concentrates on the lower side and thus it is thought that there is room for improvement at a viewpoint of absorption of the impact load.

The present disclosure has been made in view of the above-described problem and has an objective to suppress deformation of a vehicle cabin by efficiently absorbing an impact load obliquely from the vehicle front side.

Solutions to the Problems

To achieve the above-described objective, a vehicle-body front structure of an automobile including a bumper reinforcement extending in a vehicle width direction may be premised in a first aspect of the present disclosure. The vehicle-body front structure includes an upper-side cross member extending in the vehicle width direction on an upper side of the bumper reinforcement, a lower-side cross member extending in the vehicle width direction on a lower side of the bumper reinforcement, upper-side impact absorption members that each support one of both vehicle-width-direction sides of the upper-side cross member and absorb an impact load in a vehicle front-rear direction, and lower-side impact absorption members that each support one of both vehicle-width-direction sides of the lower-side cross member and absorb an impact load in the vehicle front-rear direction. The upper-side impact absorption members and the lower-side impact absorption members are each positioned farther on a vehicle-width-direction outer side at a position farther on a vehicle front side.

With this configuration, for example, when an obstacle collides with the left side of the vehicle obliquely from the front side while the automobile is traveling, an impact load obliquely toward the rear side of the vehicle is applied to the left sides of the upper-side cross member and the lower-side cross member. Since the upper-side cross member and the lower-side cross member are supported by the upper-side impact absorption members and the lower-side impact absorption members, respectively, the impact load is dispersively input to the upper-side impact absorption member and the lower-side impact absorption member positioned on the left side. In this case, since the upper-side impact absorption member and the lower-side impact absorption member positioned on the left side are each positioned farther on the left side at a position farther on the vehicle front side, the direction of the impact load obliquely from the front-left side substantially matches with the direction in which the upper-side impact absorption member and the lower-side impact absorption member extend. Accordingly, the impact load can be reliably received by the upper-side impact absorption member and the lower-side impact absorption member, and the impact load can be efficiently absorbed through deformation of the upper-side impact absorption member and the lower-side impact absorption member. This is same for the right side.

In a second aspect of the present disclosure, a rear-portion connecting portion that connects vehicle rear sides of at least either of the upper-side impact absorption members and the lower-side impact absorption members to a vehicle-body side member is further included. The rear-portion connecting portion includes a reinforcement portion formed along a sidewall portion of the impact absorption member on one vehicle-width-direction side.

With this configuration, a vehicle rear side of the impact absorption member is connected to the vehicle-body side member through the rear-portion connecting portion, and in this state, the reinforcement portion of the rear-portion connecting portion is arranged along the sidewall portion of the impact absorption member on one vehicle-width-direction side. Accordingly, inclination of the impact absorption member in the vehicle width direction, to which an impact load is applied, can be suppressed by the reinforcement portion, and thus the impact absorption member can be deformed as desired to further increase an impact absorption effect.

In a third aspect of the present disclosure, the upper-side cross member and the lower-side cross member extend further on the vehicle-width-direction outer side than the bumper reinforcement. Vehicle front sides of the upper-side impact absorption members and the lower-side impact absorption members are positioned farther on the vehicle-width-direction outer side than the bumper reinforcement.

In a fourth aspect of the present disclosure, crush cans that each support one of both vehicle-width-direction sides of the bumper reinforcement are further included. The vehicle front sides of the upper-side impact absorption members and the lower-side impact absorption members are positioned on the vehicle-width-direction outer side of vehicle front sides of the crush cans.

With this configuration, an impact load applied on the vehicle-width-direction outer side of the bumper reinforcement can be reliably absorbed by the upper-side impact absorption members and the lower-side impact absorption members.

In a fifth aspect of the present disclosure, vehicle rear sides of the crush cans are separated downward from the vehicle rear sides of the upper-side impact absorption members. The vehicle rear sides of the lower-side impact absorption members are separated downward from the vehicle rear sides of the crush cans.

With this configuration, the vehicle rear sides of the crush cans, the upper-side impact absorption members, and the lower-side impact absorption members are separated from each other in the up-down direction, and thus when an impact load is applied to the crush cans, the upper-side impact absorption members, and the lower-side impact absorption members, the impact load can be dispersed to a plurality of places separated in the up-down direction and the impact load can be avoided from being locally applied.

In a sixth aspect of the present disclosure, the traveling motor, a battery unit that is disposed below a floor panel of the automobile and supplies electric power to the traveling motor, and a vehicle-body side member to which the vehicle rear sides of the lower-side impact absorption members are connected are further included. A battery member extending in the vehicle width direction is provided at a vehicle front portion of the battery unit. The vehicle-body side member may be connected to the battery member.

Specifically, the battery unit that supplies electric power to the traveling motor has large size and weight, and thus a battery frame is formed of a member having a high strength. With the present configuration, an impact load applied to the lower-side impact absorption member is transferred from the vehicle-body side member to the battery member having a high strength and the impact load can be absorbed by the battery member as well. An impact load applied to the upper-side impact absorption member can be absorbed above the floor panel. Thus, an impact load applied at collision can be dispersed to the upper and lower sides of a vehicle body, and accordingly, deformation of a vehicle cabin is suppressed.

As described above, the upper-side impact absorption members supporting an upper-side cross member and the lower-side impact absorption members supporting a lower-side cross member are each positioned farther on a vehicle-width-direction outer side at a position farther on the vehicle front side, and thus an impact load obliquely from a vehicle front side is efficiently absorbed and dispersed to suppress deformation of a vehicle cabin.

DETAILED DESCRIPTION

One or more aspects of the present disclosure will be described below in detail with reference to the accompanying drawings.

Figure 1:
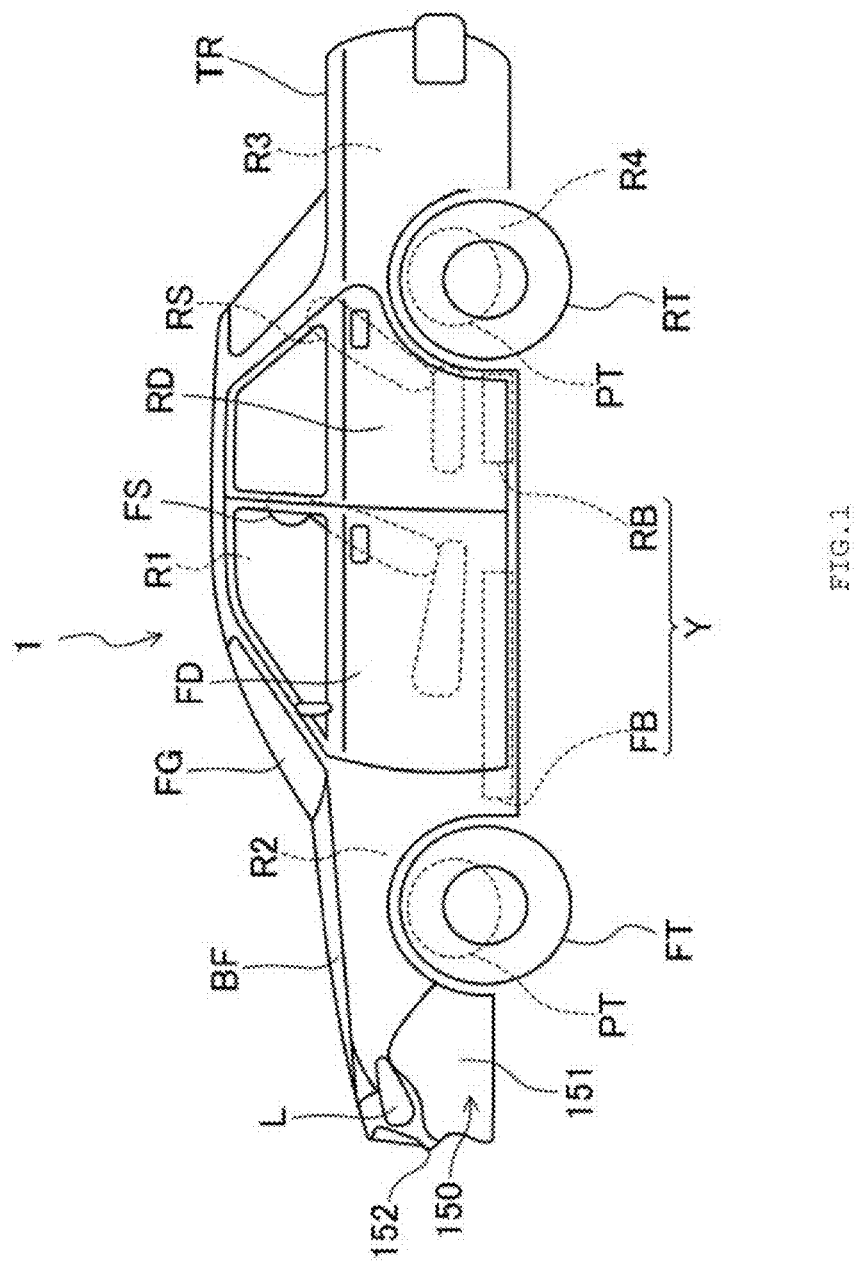
FIG. 1 is a side view of an automobile having a vehicle-body front structure according to an embodiment of the present disclosure.

FIG. 1 is a side view of an automobile 1 including a vehicle-body front structure A (illustrated in FIG. 2) according to the embodiment of the present disclosure when viewed from left. In description of the embodiment, a vehicle front-rear direction is simply referred to as a "front-rear direction", a vehicle front side is simply referred to as a "front side", and a vehicle rear side is simply referred to as a "rear side". In addition, a vehicle width direction is the right-left direction of the vehicle, a vehicle left side is simply referred to as a "left side", and a vehicle right side is simply referred to as a "right side".

Entire Structure of Automobile

The automobile 1 is a passenger automobile, and an occupant space R1 in which a passenger boards is provided at a front-rear direction intermediate portion of the automobile 1. The occupant space R1 includes front seats (front-row seats) FS included in a front row, and rear seats (rear-row seats) RS included in a rear row. The front seats FS include a driver seat arranged on the right side (or the left side) in the occupant space R1, and a front passenger seat arranged on the left side (or the right side) in the occupant space R1. The rear seats RS are arranged on the right and left sides, respectively, in the occupant space R1. Third-row seats may be arranged on the rear side of the rear seats RS. The rear seats RS are not essential and may be omitted.

A front door FD and a rear door RD are disposed on each of the left and right sides of the occupant space R1. The rear door RD may be omitted in a case of the automobile 1 including no rear seats RS.

Figure 10:
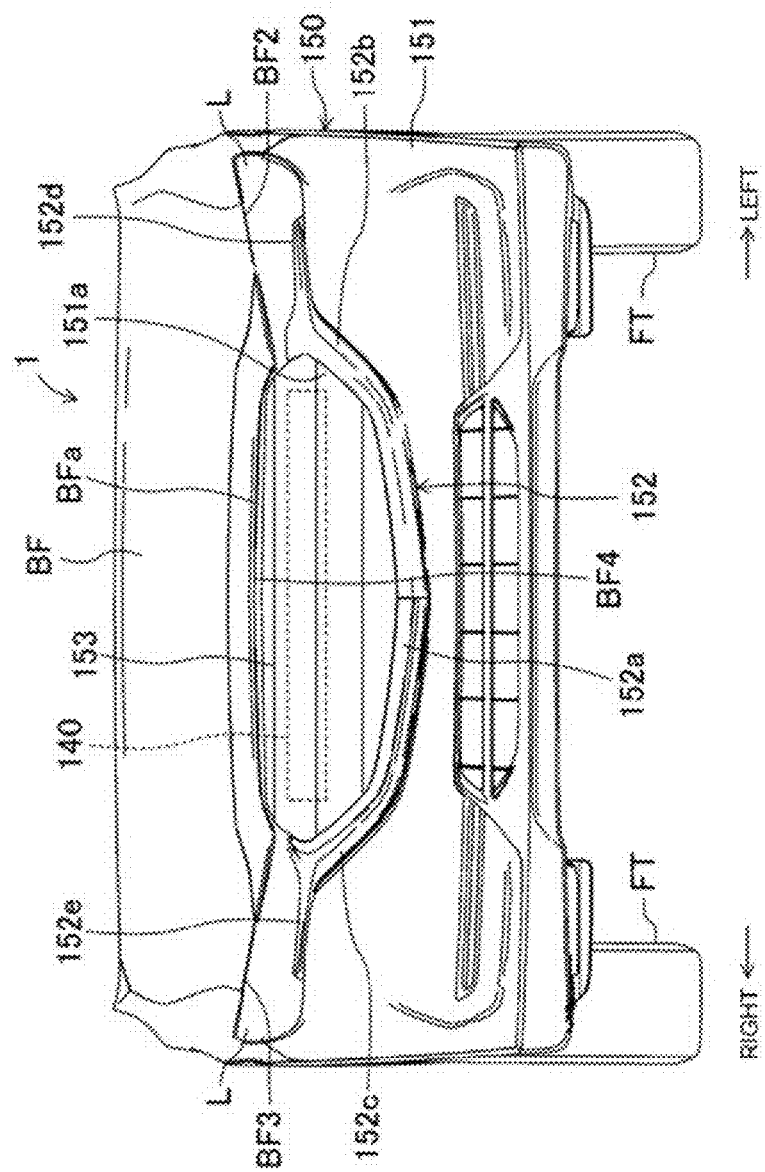
FIG. 10 is a front view of the automobile.

A front-side space R2 is provided on the front side of the occupant space R1 in the automobile 1. A powertrain PT can be mounted in the front-side space R2 as necessary. When the powertrain PT is mounted in the front-side space R2, the front-side space R2 may be called, for example, a powertrain storage room, a motor room, or an engine room. A bonnet hood BF is provided at an upper portion of the front-side space R2. A rear portion of the bonnet hood BF is supported to a vehicle body by a hinge or the like. A front bumper 150 is provided at a front of the automobile 1. As illustrated in FIG. 10 as well, left-side and right-side headlights L are provided on the right and left sides, respectively, of the front portion of the automobile 1. Each headlight L may include a winker or the like.

As illustrated in FIG. 1, a trunk space R3 in which a package or the like can be housed is provided on the rear side of the occupant space R1 of the automobile 1. The trunk space R3 can be opened and closed by a trunk lid TR. A rear-side space R4 is provided on the rear side of the occupant space R1 and at a position lower than the trunk space R3 in the automobile 1. The powertrain PT that generates power for the automobile 1 can be mounted in the rear-side space R4 as necessary. When the powertrain PT is mounted in the rear-side space R4, the rear-side space R4 may be called, for example, a powertrain storage room, a motor room, or an engine room.

The powertrain PT may be mounted in each of the front-side space R2 and the rear-side space R4 or the powertrain PT may be mounted in one of them. A front-wheel-drive vehicle in which only front wheels FT are driven by the powertrain PT is achieved when the powertrain PT is mounted only in the front-side space R2, or a rear-wheel-drive vehicle in which only rear wheels RT are driven by the powertrain PT is achieved when the powertrain PT is mounted only in the rear-side space R4. Alternatively, a four-wheel-drive vehicle is achieved when the front wheels FT and the rear wheels RT are driven by the powertrains PT mounted in both the front-side space R2 and the rear-side space R4.

Each powertrain PT includes at least a traveling motor M (illustrated in FIG. 2) for driving a drive wheel and also includes a speed reducer, a transmission, or the like as necessary. Thus, the automobile 1 is an electric vehicle. The traveling motor M is disposed such that the rotation center thereof extends in the right-left direction. The powertrain PT may include, for example, a controller in addition to the traveling motor M. The powertrain PT may include an internal combustion engine. A battery unit Y (also illustrated in FIG. 1) for supplying electric power to the traveling motor M is mounted at a lower portion of the automobile 1. For example, the battery unit Y may be charged by using power generated by the internal combustion engine, and either the front wheels FT or the rear wheels RT or both may be driven by power generated by the internal combustion engine.

The type of the automobile 1 does not necessarily need to be a four-door vehicle as exemplarily illustrated in FIG. 1 and may be, for example, an automobile including no rear doors RD. The present disclosure is also applicable to an automobile, such as a hatchback vehicle, in which the rear-side space R4 can be opened and closed by a tail gate.

Figure 2:
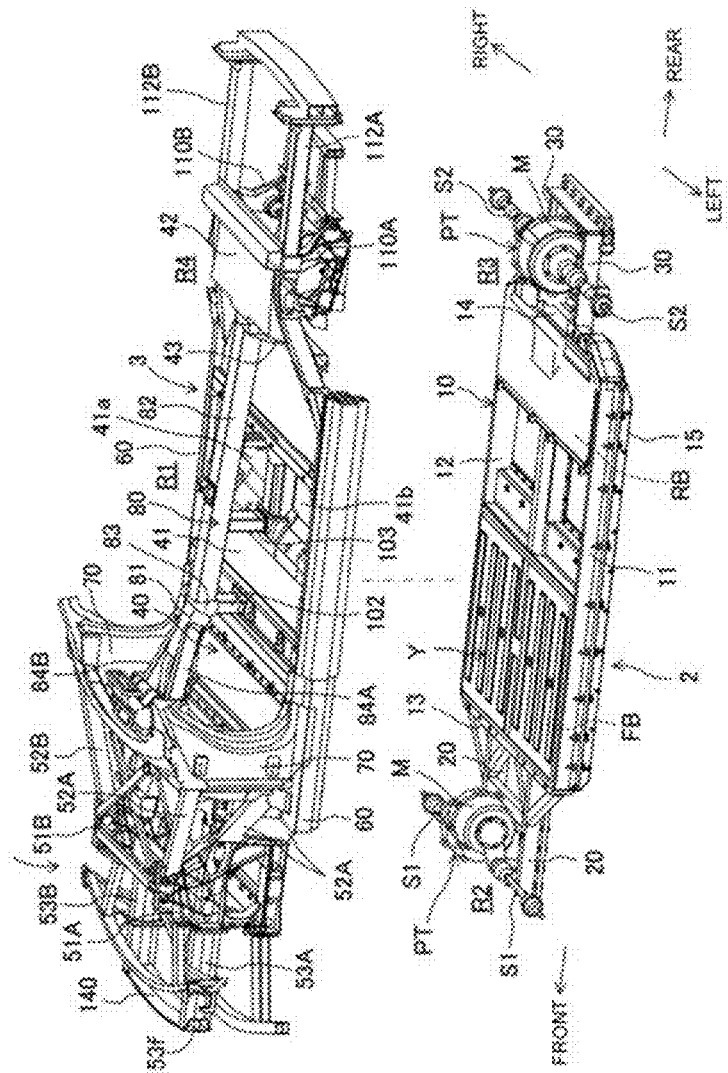
FIG. 2 is a perspective view illustrating a state in which the automobile is divided into an upper-portion structural body and a lower-portion structural body.

As illustrated in FIG. 2, the automobile 1 includes a lower-portion structural body 2 and an upper-portion structural body 3, and the vehicle-body front structure A is constituted by a front portion of the lower-portion structural body 2 and a front portion of the upper-portion structural body 3. Note that a front-rear direction intermediate portion of the lower-portion structural body 2 and a front-rear direction intermediate portion of the upper-portion structural body 3 may be included in the vehicle-body front structure A.

FIG. 2 illustrates a state in which the doors FD and RD, the bonnet hood BF, a fender, window glasses, a roof, a center pillar, a rear pillar, the front bumper 150, a rear bumper, front and rear lighting devices (such as the headlights L) including headlights, an instrument panel, the front and rear seats, and the like, which are included in the upper-portion structural body 3 in reality, are removed. FIG. 2 also illustrates a state in which the front wheels FT, the rear wheels RT, a suspension device, and the like, which are included in the lower-portion structural body 2 in reality, are removed.

The lower-portion structural body 2 includes the battery unit Y. The battery unit Y includes a front-side battery FB, a rear-side battery RB, and a rack frame 10 surrounding the front-side battery FB and the rear-side battery RB. The lower-portion structural body 2 also includes a front support frame 20 extending from a front portion of the rack frame 10 toward the front side, and a rear support frame 340 extending from a rear portion of the rack frame 10 toward the rear side.

In a typical electric automobile, a battery unit is often detachably attached as a separated body from a vehicle body under a floor, but in the present embodiment, not only the batteries FB and RB but also the front support frame 20 and the rear support frame 30 are integrated with the rack frame 10 surrounding the batteries FB and RB, and the front support frame 20 and the rear support frame 30 are detachably attached to the upper-portion structural body 3 together with the batteries FB and RB.

Specifically, the automobile 1 of the present embodiment is configured to be able to be divided in the up-down direction into the lower-portion structural body 2 including the batteries FB and RB, and the upper-portion structural body 3 in which the occupant space R1 and the trunk space R3 are formed. Being able to be divided in the up-down direction means integration of the lower-portion structural body 2 with the upper-portion structural body 3 by using fastening members such as bolts and nuts, screws, and the like without using welding, bonding, and the like. Accordingly, the lower-portion structural body 2 can be separated from the upper-portion structural body 3 as necessary when maintenance and repair are performed after the automobile 1 is handed over to a user, and thus maintainability is excellent.

A vehicle-body structure of a ladder frame type is known as the vehicle-body structure of an automobile. In a case of the vehicle-body structure of the ladder frame type, division into a ladder frame and a cabin in the up-down direction is possible, but the ladder frame continuously extends in the front-rear direction and thus mainly receives a collision load at front collision and rear collision. At side collision, the ladder frame only supplementarily receives a collision load, and the collision load is mainly received by the cabin. In this manner, in the vehicle-body structure of the ladder frame type, it is normal that a member that receives a collision load is different between front or rear collision and side collision.

However, in a case of the automobile 1 of the present embodiment, the lower-portion structural body 2, which includes the front support frame 20 and the rear support frame 30, and the upper-portion structural body 3 can be divided from each other, but its technical idea is largely different from that of the conventional vehicle-body structure of the ladder frame type in that a collision load is received by the lower-portion structural body 2 and the upper-portion structural body 3 in both cases of front or rear collision and side collision and thus the collision load can be dispersed to and absorbed by the structural bodies 2 and 3. Hereinafter, the structures of the lower-portion structural body 2 and the upper-portion structural body 3 will be sequentially described. Note that an example in which division into the lower-portion structural body 2 and the upper-portion structural body 3 is possible will be described below in the present embodiment, but the present disclosure is not only applied to a vehicle-body structure in which such division is possible, but is also applicable to a vehicle-body structure that cannot be divided into the lower-portion structural body 2 and the upper-portion structural body 3.

Lower-Portion Structural Body

First, the lower-portion structural body 2 will be described below. The lower-portion structural body 2 includes the powertrain PT, the front wheels FT, the rear wheels RT, and front-side suspension devices SP1 and SP2 and rear-side suspension devices SP3 and SP4, which are illustrated with virtual lines in FIG. 3, in addition to the batteries FB and RB, the rack frame 10, the front support frame 20, and the rear support frame 30. The formats of the front-side suspension devices SP1 and SP2 and the rear-side suspension devices SP3 and SP4 are not particularly limited, and the vehicle-body structure may be changed in accordance with the formats of the front-side suspension devices SP1 and SP2 and the rear-side suspension devices SP3 and SP4.

As illustrated in FIG. 2, the rack frame 10 as a framework of the battery unit Y is a member for surrounding and protecting the front-side battery FB, the rear-side battery RB, harnesses, and the like. The rack frame 10 is formed in such a large size that, on the lower side of an occupant-space-side floor panel 41 to be described later, the rack frame 10 extends from the vicinity of a left end portion of the occupant-space-side floor panel 41 to the vicinity of a right end portion thereof and extends from the vicinity of a front end portion of the occupant-space-side floor panel 41 to the vicinity of a rear end portion thereof. In this manner, since the rack frame 10 is provided in a large part of a region on the lower side of the occupant-space-side floor panel 41, the batteries FB and RB having large capacities can be mounted on the automobile 1. The batteries FB and RB may be, for example, lithium-ion batteries or all-solid-state batteries or may be any other secondary batteries. Alternatively, the batteries FB and RB may be what is called battery cells or may be battery packs in which a plurality of battery cells are housed.

The rack frame 10 includes a left-side member 11, a right-side member 12, a front-side member 13, and a rear-side member 14, and these members 11 to 14 are battery members. The left-side member 11, the right-side member 12, the front-side member 13, and the rear-side member 14 are formed of, for example, an extruded material made of an aluminum alloy, but may be formed of a press-formed material such as an aluminum alloy plate material or a steel plate. In description below, an "extruded material" is an extruded material made of an aluminum alloy, and a "press-formed material" is a press-formed material such as an aluminum alloy plate material or a steel plate. Alternatively, each member may be formed of, for example, cast metal or die cast.

A cross-sectional shape of each of the left-side member 11, the right-side member 12, the front-side member 13, and the rear-side member 14 in a direction orthogonal to its longitudinal direction is a rectangular shape. The left-side member 11, the right-side member 12, the front-side member 13, and the rear-side member 14 are all arranged at the same height and substantially horizontally extend. The front-side member 13 extends in the vehicle width direction at a front portion of the battery unit Y.

When the lower-portion structural body 2 is to be connected to the upper-portion structural body 3, the front-side member 13 is fastened and fixed to a lower portion of a dash panel 50 by a fastening member, and the left-side member 11 and the right-side member 12 are fastened and fixed to right and left side sills 60, respectively, by fastening members. The rear-side member 14 is fastened and fixed to a connection panel 43, which will be described later, by a fastening member.

The left-side member 11 is provided at a left end portion of the lower-portion structural body 2 and extends in the front-rear direction. The right-side member 12 is provided at a right end portion of the lower-portion structural body 2 and extends in the front-rear direction. The left-side member 11 and the right-side member 12 are arranged on a vehicle-width-direction inner side of the right and left side sills 60, respectively, to be described later. The front-side member 13 extends from a front end portion of the left-side member 11 to a front end portion of the right-side member 12. A left end portion of the front-side member 13 and the front end portion of the left-side member 11 are connected to each other, and a right end portion of the front-side member 13 and the front end portion of the right-side member 12 are connected to each other. The rear-side member 14 is provided at a rear portion of the battery unit Y and extends in the right-left direction from a rear end portion of the left-side member 11 to a rear end portion of the right-side member 12. A left end portion of the rear-side member 14 and the rear end portion of the left-side member 11 are connected to each other, and a right end portion of the rear-side member 14 and the rear end portion of the right-side member 12 are connected to each other.

A cover member 15 (illustrated in FIG. 5) as a bottom plate is attached to a lower portion of the rack frame 10. A path component 15a constituting a cooling water path through which cooling water can circulate is provided on the cover member 15. The rack frame 10 is blocked from the lower side by the cover member 15. The cover member 15 substantially horizontally extends and is fixed to lower surfaces of the left-side member 11, the right-side member 12, the front-side member 13, and the rear-side member 14 and also fixed to the side sills 60 as described later. Note that an upper portion of the rack frame 10 may be blocked by a lid or may be blocked by the occupant-space-side floor panel 41 to be described later. Note that electric power of the batteries FB and RB housed in the rack frame 10 is supplied to the traveling motor M through a traveling control circuit. The batteries FB and RB can be charged through a charging socket.

Figure 4:
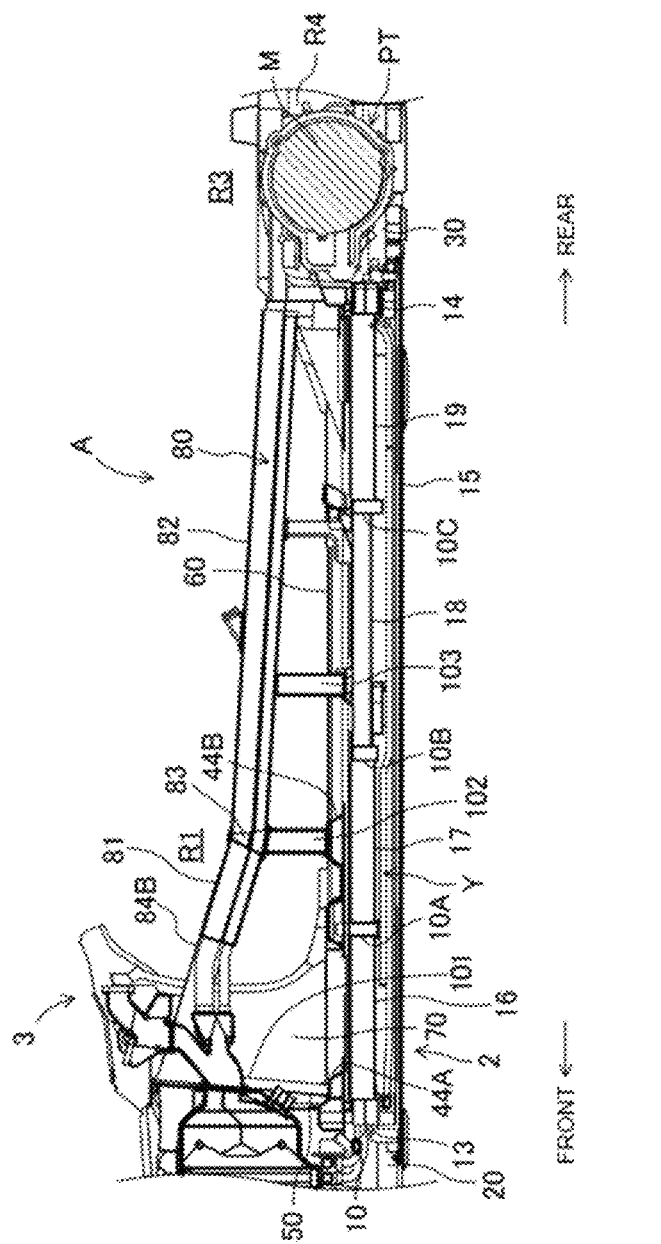
FIG. 4 is a cross-sectional diagram along line IV-IV in FIG. 3.
Figure 5:
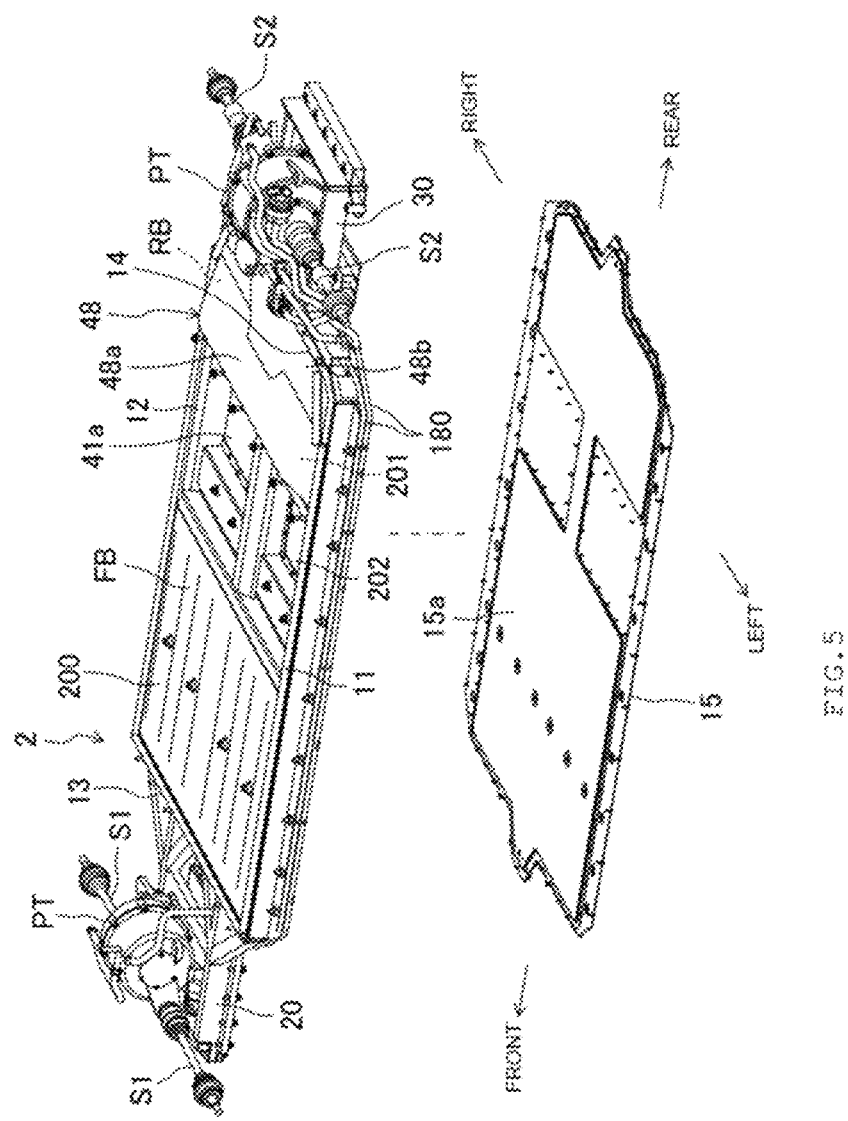
FIG. 5 is a perspective view illustrating the lower-portion structural body in a state in which a cover member is removed.

FIG. 4 illustrates a cross-section of a right-left direction central portion of the vehicle-body front structure A. As illustrated in FIG. 5, first to third battery-side cross members 10A, 10B, and 10C as reinforcement members extending in the right-left direction are provided inside the rack frame 10. The first to third battery-side cross members battery-side cross members 10A, 10B, and 10C are arranged at an interval from each other in the front-rear direction. Left end portions of the battery-side cross members 10A, 10B, and 10C are fixed to an inner surface (right-side surface) of the left-side member 11, and right end portions of the battery-side cross members 10A, 10B, and 10C are fixed to an inner surface (left-side surface) of the right-side member 12. In addition, a front-portion central member 16 and first to third rear-portion central members 17 to 19 as reinforcement members extending in the front-rear direction are provided inside the rack frame 10.

As illustrated in FIG. 2, a pair of right and left front support frames 20 are provided and substantially horizontally extend in straight lines on the lower side of the upper-portion structural body 3. Each front support frame 20 may be formed of, for example, an extruded material or a press-formed material. In the present embodiment, each front support frame 20 is formed of an extruded material, and thus a cross-sectional shape thereof in a direction orthogonal to the front-rear direction is substantially constant from a front end portion to a rear end portion.

The left-side front support frame 20 is connected to a site on the left side of a right-left direction center of the front-side member 13 constituting the front portion of the rack frame 10, and this connection site is positioned on the right side of the left-side member 11 of the rack frame 10. The right-side front support frame 20 is connected to a site on the right side of the right-left direction center of the front-side member 13, and this connection site is positioned on the left side of the right-side member 12 of the rack frame 10. The heights of the right and left front support frames 20 are substantially same.

The front-side powertrain PT is attached to each front support frame 20 through a mounting member. In this case, the front support frame 20 serves as a front-side motor support frame that supports the traveling motor M on the front side of the battery unit Y. In the lower-portion structural body 2, drive shafts S1 through which output from the powertrain PT (rotational force of the traveling motor M) is transferred to the right and left front wheels FT, respectively, are provided on the right and left sides.

As illustrated in FIG. 2, similarly to the front support frames 20, a pair of right and left rear support frames 30 are provided and substantially horizontally extend in straight lines toward the rear side. Each rear support frame 30 may be formed of, for example, an extruded material or a press-formed material. In the present embodiment each rear support frame 30 is formed of an extruded material.

The left-side rear support frame 30 is connected to a site on the left side of a right-left direction center of the rear-side member 14 constituting the rear portion of the rack frame 10, and this connection site is positioned on the right side of the left-side member 11 of the rack frame 10. The right-side rear support frame 30 is connected to a site on the right side of the right-left direction center of the rear-side member 14, and this connection site is positioned on the left side of the right-side member 12 of the rack frame 10.

The rear-side powertrain PT is attached to each rear support frame 30 through a mounting member. In this case, the rear support frame 30 serves as a rear-side motor support frame that supports the rear-side traveling motor M of the battery unit Y. In the lower-portion structural body 2, drive shafts S2 through which output from the powertrain PT (rotational force of the traveling motor M) is transferred to the right and left rear wheels, respectively, are provided on the right and left sides.

Upper-Portion Structural Body

Subsequently, the upper-portion structural body 3 will be described below. The upper-portion structural body 3 includes a floor member 40, the dash panel. 50, and the pair of right and left side sills 60. The floor member 40 is a member arranged at a higher position than the rack frame 10 and the rear support frames 30 of the lower-portion structural body 2. The floor member 40 includes the occupant-space-side floor panel 41 constituting a floor of the occupant space R1 including the front seats FS and the rear seats RS (illustrated in FIG. 1) on which passengers sits, a trunk-space-side floor panel 42 constituting a floor of the trunk space R3, and the connection panel 43 connecting a rear portion of the occupant-space-side floor panel 41 and a front portion of the trunk-space-side floor panel 42. A kick-up portion is constituted by the connection panel 43.

The floor member 40 may be formed of, for example, a member shaped by pressing a steel plate or the like. The occupant-space-side floor panel 41, the trunk-space-side floor panel 42, and the connection panel 43 may be integrally formed or may be formed by separately forming components and then connecting them. In the present embodiment, description is made with the three divided portions of the occupant-space-side floor panel 41, the trunk-space-side floor panel 42, and the connection panel 43, but the floor member 40 including the panels 41 to 43 may be referred to as a floor panel. Alternatively, only the occupant-space-side floor panel 41 may be referred to as a floor panel.

The occupant-space-side floor panel 41 extends from a front portion of the occupant space R1 to a rear portion thereof and from a left-side portion of the occupant space R1 to a right-side portion thereof. The occupant-space-side floor panel 41 according to the present embodiment has a floor tunnel-less structure including no tunnel portion but may include a tunnel portion.

A recessed portion 41a formed bulging downward is formed at a front-rear direction intermediate portion of the occupant-space-side floor panel 41. The recessed portion 41a has a bottom surface 41b on which the feet of a rear-seat passenger sitting on a rear seat RS can be placed. The bottom surface 41b is substantially horizontally formed. The recessed portion 41a may be continuously formed from a left side portion of the occupant-space-side floor panel 41 to a right side portion thereof.

The trunk-space-side floor panel 42 is positioned higher than the occupant-space-side floor panel 41. The rear-side space R4 is positioned lower than the trunk-space-side floor panel 42. Since the trunk-space-side floor panel 42 is arranged at a higher position than the occupant-space-side floor panel 41, the connection panel 43 extends in the up-down direction.

As illustrated in FIG. 4 as well, the dash panel 50 is a member as a partition wall between the front-side space R2 and the occupant space R1 and extends upward from a front portion of the occupant-space-side floor panel 41 and in the right-left direction as well, thereby partitioning the front portion of the occupant space R1.

As illustrated in FIG. 2, the right and left side sills 60 are disposed extending in the front-rear direction at right and left end portions, respectively, of the occupant-space-side floor panel 41. The left end portion of the occupant-space-side floor panel 41 is connected to an up-down direction intermediate portion of the left side sill 60, an upper part of the side sill 60 protrudes upward from a connection site of the occupant-space-side floor panel 41, and a lower part of the side sill 60 protrudes downward from the connection site of the occupant-space-side floor panel 41. Since the battery unit Y including the batteries FB and RB is disposed at a lower position than the occupant-space-side floor panel 41, such arrangement is made that the lower part of the side sill 60 overlaps with the batteries FB and RB in a vehicle side view. Similarly, the right side sill 60 is connected to the right end portion of the occupant-space-side floor panel 41.

The upper-portion structural body 3 includes a pair of right and left hinge pillars 70. The right hinge pillar 70 extends upward from a front end portion of the right side sill 60. The left hinge pillar 70 extends upward from a front end portion of the left side sill 60. The right and left front doors FD (illustrated in FIG. 1) are rotatably attached to the right and left hinge pillars 70, respectively. A left edge portion of the dash panel 50 is connected to a right-side surface of the left hinge pillar 70. A right edge portion of the dash panel 50 is connected to a left-side surface of the right hinge pillar 70. Note that, the upper-portion structural body 3 is also provided with a center pillar, a rear pillar, and the like.

A left-side front-wheel suspension support member 51A that supports the suspension device (front suspension device) SP1 (illustrated with virtual lines in FIG. 4) for the left front wheel. FT is provided on the left side on the front side of the dash panel 50 in the upper-portion structural body 3. A right-side front-wheel suspension support member 51B that supports the suspension device (front suspension device) SP2 (illustrated with virtual lines in FIG. 4) for the right front wheel FT is provided on the right side on the front side of the dash panel 50 in the upper-portion structural body 3. The suspension devices SP1 and SP2 are not limited to a particular format but include suspension arms that freely swingably support the front wheels FT in the up-down direction, shock absorbers, springs, or the like. End portions of the suspension arms on the vehicle body side, upper end portions of the shock absorbers, or the like are attached to the front-wheel suspension support members 51A and 51B. The front-wheel suspension support members 51A and 51B can be made of, for example, aluminum die cast, but are not limited thereto and may be made of a combination of steel plates or the like.

Figure 6:
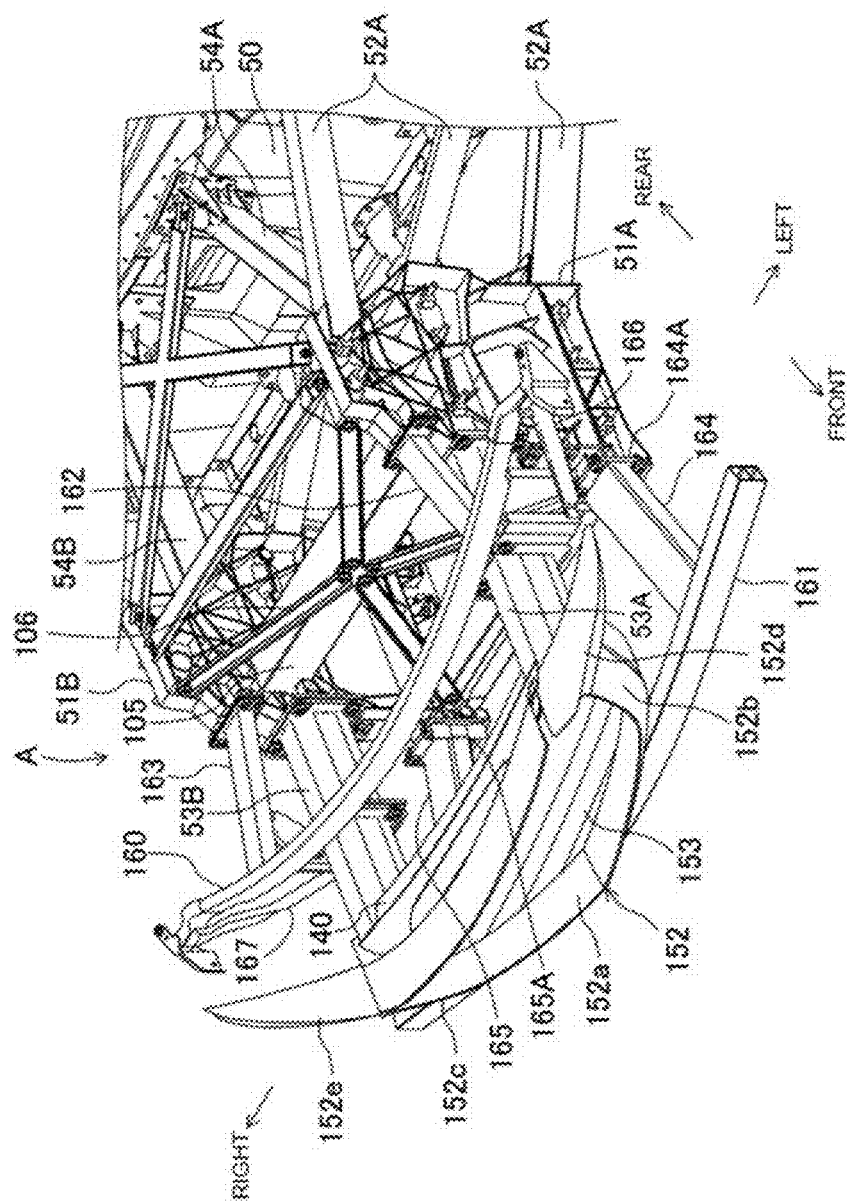
FIG. 6 is a perspective view in which part of the automobile on a front side is viewed from an upper side.

As illustrated in, for example, FIG. 6, three left-side fixation frames 52A for fixing the left-side front-wheel suspension support member 51A are provided on the left side on the front side of the dash panel 50. The three left-side fixation frames 52A are arranged at an interval from each other in the up-down direction, and front portions of the three left-side fixation frames 52A are fixed to the front-wheel suspension support member 51A. Rear portions of the left-side fixation frames 52A arranged uppermost and at an up-down direction intermediate position are fixed to the left-side hinge pillar 70 and the left side of the dash panel 50. A rear portion of the left-side fixation frame 52A arranged lowermost is connected to the left side sill 60 and the left side of the front-side member 13 of the rack frame 10. Accordingly, a rear portion of the left-side front-wheel suspension support member 51A can be connected to the front-side member 13.

Figure 3:
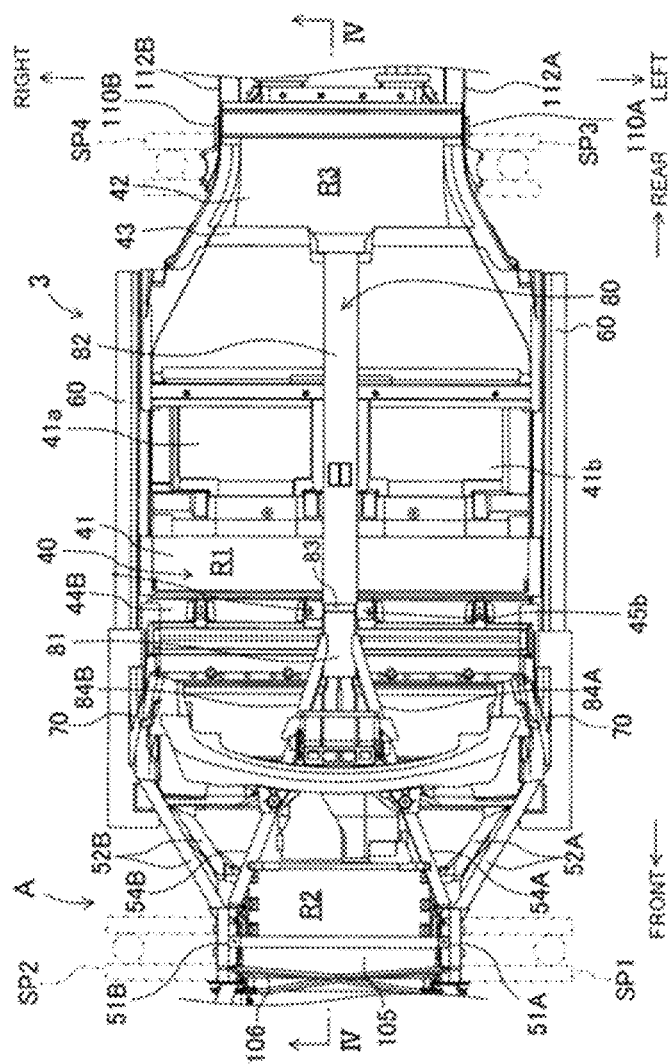
FIG. 3 is a plan view of part of a vehicle body.

As illustrated in FIG. 3, three right-side fixation frames 52B for fixing the right-side front-wheel suspension support member 51B are provided on the right side on the front side of the dash panel 50. The three right-side fixation frames 52B are arranged at an interval from each other in the up-down direction, and front portions of the three right-side fixation frames 52B are fixed to the front-wheel suspension support member 51B. Rear portions of the right-side fixation frames 52B arranged uppermost and at an up-down direction intermediate position are fixed to the right-side hinge pillar 70 and the right side of the dash panel 50. A rear portion of the right-side fixation frame 52B arranged lowermost is connected to the right side sill 60 and the right side of the front-side member 13 of the rack frame 10. Accordingly, a rear portion of the right-side front-wheel suspension support member 51B can be connected to the front-side member 13.

Figure 8:
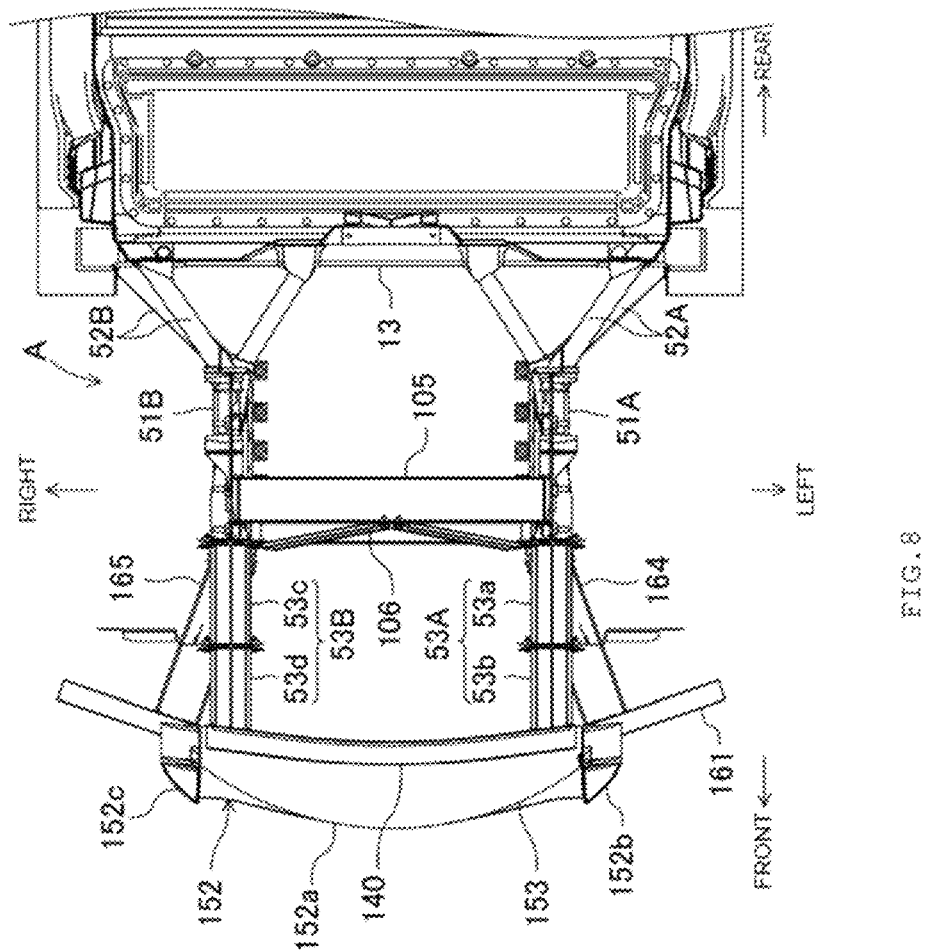
FIG. 8 is a plan view of the vehicle-body front portion.
Figure 9:
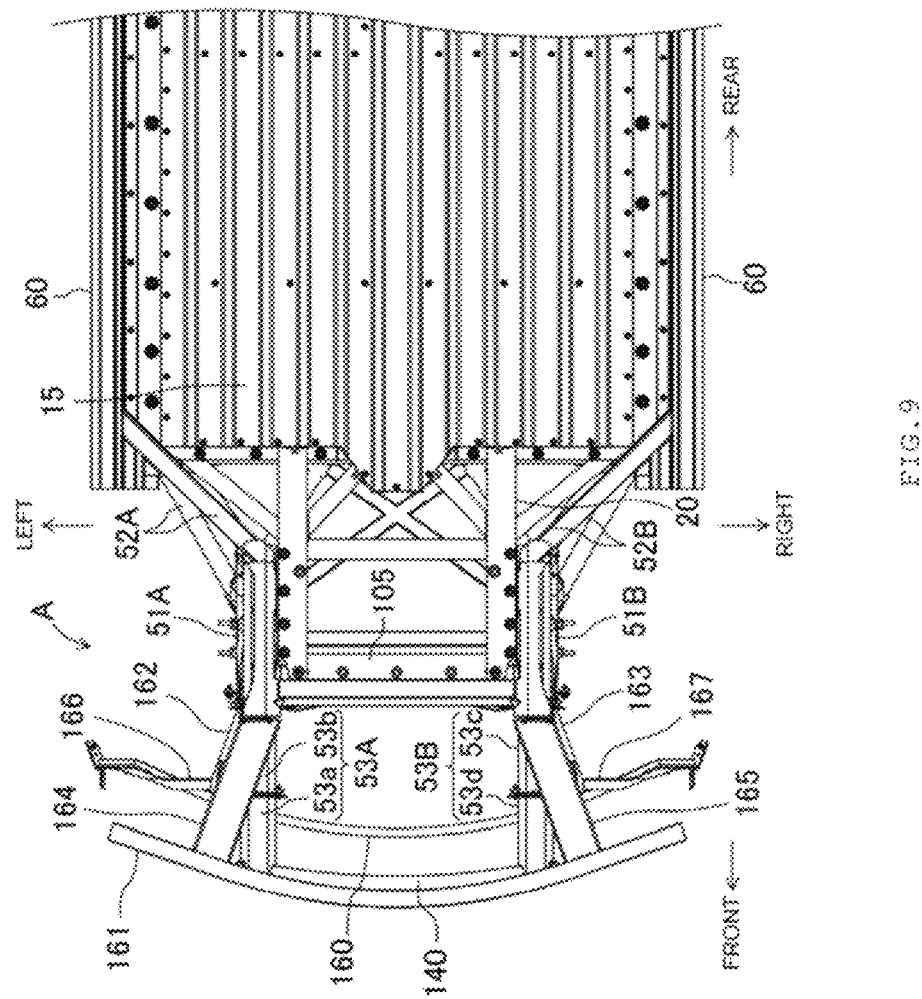
FIG. 9 is a bottom view of the vehicle-body front portion.

As illustrated in FIG. 8, an up-down direction intermediate portion of the left-side front-wheel suspension support member 51A and an up-down direction intermediate portion of the right-side front-wheel suspension support member 51B are connected to each other through a lower-portion connection member 105 extending in the right-left direction. As illustrated in FIG. 6, a reinforcement member 106 connecting an upper portion of the left-side front-wheel suspension support member 51A, a lower portion of the left-side front-wheel suspension support member 51A, an upper portion of the right-side front-wheel suspension support member 51B, and a lower portion of the right-side front-wheel suspension support member 51B is provided as well.

As illustrated in, for example, FIGS. 6 and 8, a left-side crush can 53A extending toward the front side is attached to a front portion of the left-side front-wheel suspension support member 51A as a vehicle-body side member. A right-side crush can 53B extending toward the front side is attached to a front portion of the right-side front-wheel suspension support member 51B as a vehicle-body side member. A bumper reinforcement 140 extending in the right-left direction is attached to a front portion of the left-side crush can 53A and a front portion of the right-side crush can 53B.

As illustrated in FIG. 3, the upper-portion structural body 3 includes a left-side front frame 54A and a right-side front frame 54B. Specifically, the left-side front frame 54A connecting a front portion of a center frame 80 to be described later and the left-side front-wheel suspension support member 51A, and the right-side front frame 54B connecting the front portion of the center frame 80 and the right-side front-wheel suspension support member 51B are provided on the front side of the dash panel 50. The left-side front frame 54A is tilted such that the left-side front frame 54A is positioned farther on the left side at a position farther on the front side. The right-side front frame 54B is tilted such that the right-side front frame 54B is positioned farther on the right side at a position farther on the front side. Since the right and left front-wheel suspension support members 51A and 51B are each connected to the front portion of the center frame 80, the stiffness of the front-wheel suspension support members 51A and 51B is increased, which improves maneuvering stability of the vehicle. In addition, the stiffness of the vehicle front side including the vicinity of the dash panel 50 is increased as well.

The upper-portion structural body 3 includes a left-side rear-side frame 112A extending in the front-rear direction on the left side on the rear side of the rear portion of the occupant-space-side floor panel 41, and a right-side rear-side frame 112B extending in the front-rear direction on the right side on the rear side of the rear portion of the occupant-space-side floor panel 41.

A left-side rear-wheel suspension support member 110A that supports the suspension device (rear suspension device) SP3 (illustrated with virtual lines in FIG. 3) for the left rear wheel RT is provided on the left side on the rear side of the connection panel 43 in the upper-portion structural body 3. A right-side rear-wheel suspension support member 110B that supports the suspension device (rear suspension device) SP4 (illustrated with virtual lines in FIG. 4) for the right rear wheel RT is provided on the right side on the rear side of the connection panel 43 in the upper-portion structural body 3.

As illustrated in FIGS. 3 and 6, the occupant-space-side floor panel 41 includes a front-portion cross member 44A and an intermediate cross member 44B. The front-portion cross member 44A and the intermediate cross member 44B extend in the right-left direction and are fixed to an upper surface of the occupant-space-side floor panel 41.

The front-portion cross member 44A is disposed at the front portion of the occupant-space-side floor panel 41. A front portion of the front-portion cross member 44A is also joined to the lower portion of the dash panel 50. The intermediate cross member 44B is disposed on the rear side of the front-portion cross member 44A and on the front side of the recessed portion 41a, and a closed cross-section is constituted by the intermediate cross member 44B and the occupant-space-side floor panel 41.

As illustrated in, for example, FIG. 2, the upper-portion structural body 3 includes the center frame 80 continuously extending in the front-rear direction from the dash panel 50 to the connection panel 43. The center frame 80 is positioned at a right-left direction central portion, and a rear portion of the center frame 80 is connected to the connection panel 43. The center frame 80 is disposed to be higher than and away from the occupant-space-side floor panel 41 at a right-left direction central portion of the occupant space R1. The distance between a lower surface of the center frame 80 and the upper surface of the occupant-space-side floor panel 41 may be set to be, for example, equal to or larger than 10 cm or equal to or larger than 20 cm at a part separated most. The left-side front seat FS and a rear seat RS are disposed on the left side of the center frame 80, and the right-side front seat FS and a rear seat RS are disposed on the right side of the center frame 80.

Since the center frame 80 is arranged to be higher than and away from the occupant-space-side floor panel. 41, components and the like can be disposed in a space between a lower surface of the center frame 80 and the upper surface of the occupant-space-side floor panel 41. Alternatively, the space between the lower surface of the center frame 80 and the upper surface of the occupant-space-side floor panel 41 can be used as an object housing unit.

The center frame 80 includes a front-side frame member 81 extending in the front-rear direction, a rear-side frame member 82 disposed on the vehicle rear side of the front-side frame member 81 and extending toward the rear side, and a connection member 83 connecting a rear portion of the front-side frame member 81 and a front portion of the rear-side frame member 82. The front-side frame member 81 and the rear-side frame member 82 have hollow shapes, in other words, tubular shapes extending in the front-rear direction and may be formed of, for example, an extruded material. The front-side frame member 81 and the rear-side frame member 82 having hollow shapes are lightweight and high-stiffness members. Note that the center frame 80 is not limited to the two-division structure of the front-side frame member 81 and the rear-side frame member 82 but may be formed as one member a front portion to a rear portion or may have a three-division structure. When the center frame 80 is formed as one member, the connection member 83 may be omitted.

As illustrated in FIG. 3, the center frame 80 includes a left-side frame member 84A and a right-side frame member 84B constituting the front portion of the center frame 80, and accordingly, the front portion of the center frame 80 has a shape bifurcated in the right-left direction. The left-side frame member 84A and the right-side frame member 84B are provided at an interval from each other in the right-left direction. A rear portion of the left-side frame member 84A is fixed to a left-side surface of a front-rear direction intermediate portion of the front-side frame member 81. The left-side frame member 84A is tilted from a fixation part to the front-side frame member 81 toward the front side in a plan view such that the left-side frame member 84A is positioned farther on the left side at a position farther on the front side. A front portion of the left-side frame member 84A is connected to a part of the dash panel 50 higher than and away from the occupant-space-side floor panel 41. A rear portion of the left-side front frame 54A is connected to the front portion of the left-side frame member 84A.

A rear portion of the right-side frame member 84B is fixed to a right-side surface of the front-rear direction intermediate portion of the front-side frame member 81. The right-side frame member 84B is tilted from a fixation part to the front-side frame member 81 toward the front side in a plan view such that the right-side frame member 84B is positioned farther on the right side at a position farther on the front side. A front portion of the right-side frame member 84B is connected to the part of the dash panel 50 higher than and away from the occupant-space-side floor panel 41. A rear portion of the right-side front frame 54B is connected to the front portion of the right-side frame member 84B.

The upper-portion structural body 3 includes a first fixation member 101, a second fixation member 102, and a third fixation member 103 that fix the center frame 80 to the occupant-space-side floor panel 41. The first fixation member 101 is disposed farthest on the front side in the occupant space R1, and the first fixation member 101 is separated on the rear side from the dash panel 50. The second fixation member 102 is separately disposed on the rear side from the first fixation member 101. The third fixation member 103 is separately disposed on the rear side from the second fixation member 102.

Figure 11:
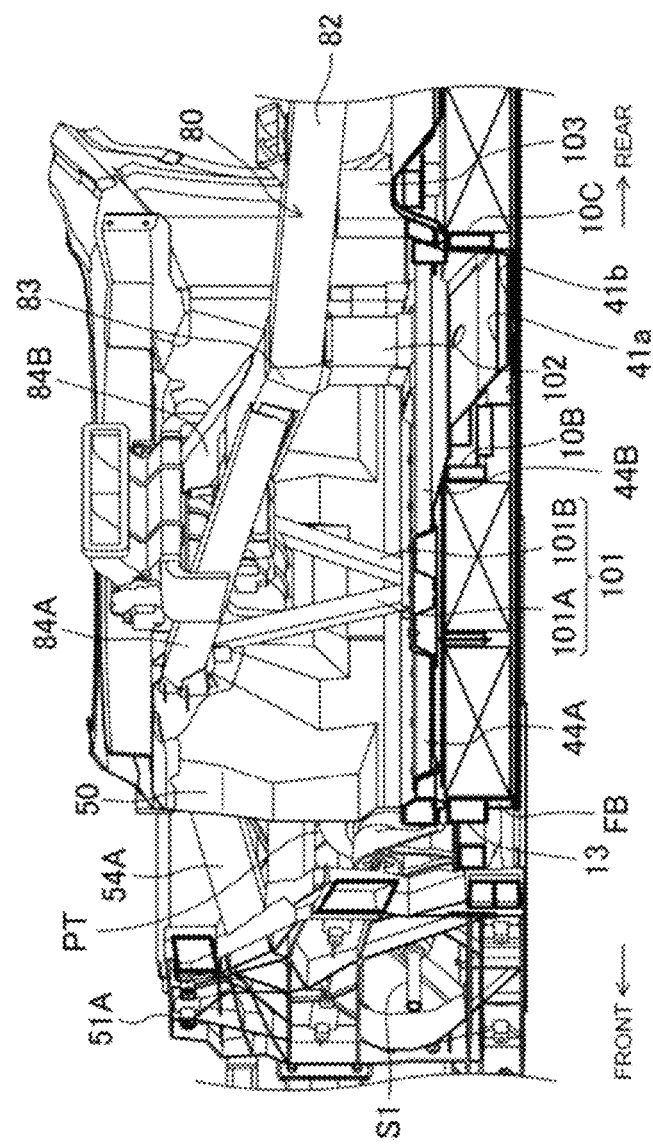
FIG. 11 is a perspective view of a dash panel and the vicinity thereof when viewed from a vehicle rear side.

As illustrated in FIG. 11, the first fixation member 101 includes a left-side member 101A and a right-side member 101B. Lower portions of the left-side member 101A and the right-side member 101B are fixed to the front-portion cross member 44A. The left-side member 101A extends at a tilt in a front view such that the left-side member 101A is positioned farther on the left side at a position farther on the upper side from the front-portion cross member 44A. An upper portion of the left-side member 101A is fixed to the front portion of the left-side frame member 84A of the center frame 80.

The right-side member 101B extends at a tilt in a front view such that the right-side member 101B is positioned farther on the right side at a position farther on the upper side from the front-portion cross member 44A. An upper portion of the right-side member 101B is fixed to the front portion of the right-side frame member 84B of the center frame 80.

Detailed Structures of Front Bumper and Bumper Reinforcement

Figure 7:
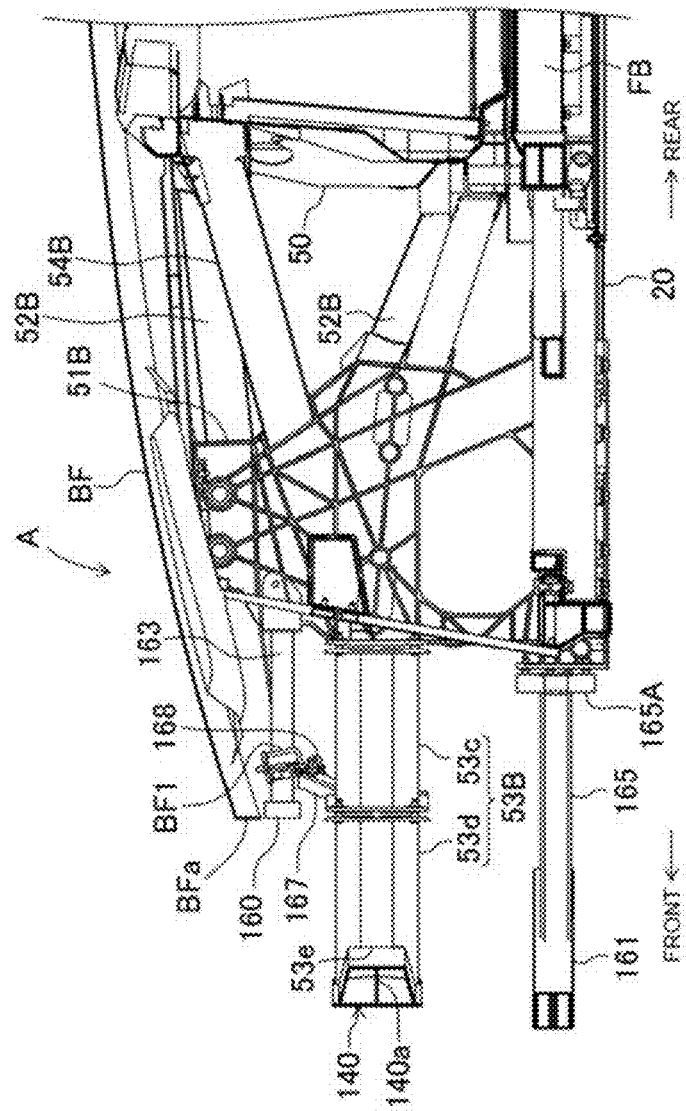
FIG. 7 is a cross-sectional diagram of a vehicle-body front portion.

As illustrated in FIG. 8, the bumper reinforcement 140 provided at a front portion of the vehicle-body front structure A extends from the front portion of the left-side crush can 53A to the front portion of the right-side crush can 53B. A left-side portion of the bumper reinforcement 140 is fixed to the front portion of the left-side crush can 53A, and a right-side portion of the bumper reinforcement 140 is fixed to the front portion of the right-side crush can 53B. Accordingly, the left-side portion of the bumper reinforcement 140 is supported by the left-side crush can 53A, the right-side portion of the bumper reinforcement 140 is supported by the right-side crush can 53B, and the left-side crush can 53A and the right-side crush can 53B are connected to each other through the bumper reinforcement 140. The bumper reinforcement 140 is curved such that a right-left direction central portion thereof is positioned farthest on the front side and the bumper reinforcement 140 is positioned farther on the rear side at positions farther on the left side and the right side from the right-left direction central portion. The bumper reinforcement 140 is formed of, for example, an extruded material. As illustrated in FIG. 7, a rib 140a extending in the right-left direction and the front-rear direction is provided inside the bumper reinforcement 140. Note that the bumper reinforcement 140 may extend straight in the right-left direction.

The left-side portion of the bumper reinforcement 140 is arranged not to largely protrude on the left side from the front portion of the left-side crush can 53A. The right-side portion of the bumper reinforcement 140 is arranged not to largely protrude on the right side from the front portion of the right-side crush can 53B. Specifically, a cutout portion 53*e* opened on the front side is formed at the front portion of the right-side crush can 53B as illustrated in FIG. 7, and a cutout portion 53*f* opened on the front side is formed at the front portion of the left-side crush can 53A as illustrated in FIG. 2. The shapes of the cutout portions 53*e* and 53*f* are shapes along the outer shape of the bumper reinforcement 140. The right-side portion of the bumper reinforcement 140 is fitted and fixed to the cutout portion 53*e* of the right-side crush can 53B by welding or the like, and the left-side portion of the bumper reinforcement 140 is fitted and fixed to the cutout portion 53*f* of the left-side crush can 53A by welding or the like. Note that the fixation structure of the bumper reinforcement 140 is not limited thereto and may be a fixation structure using fastening members such as bolts, nuts, and rivets.

As illustrated in FIG. 10, the front bumper 150 provided at the front portion of the automobile 1 includes a bumper fascia 151 made of resin, a decorative member 152, and a front grill 153 as exterior members of the automobile 1. The bumper fascia 151 extends from a left end portion of the vehicle body to a right end portion thereof such that the bumper fascia 151 can cover the bumper reinforcement 140 and the like. The bumper fascia 151 is attached to an upper-side cross member 160 to be described later and the like and is easily deformable at collision with a pedestrian or the like.

An opening 151*a* through which, for example, cooling air can be taken in is formed at a right-left direction central portion of an upper portion of the bumper fascia 151. The opening 151*a* has a shape that is long in the right-left direction, but is not limited thereto and may have a shape that is long in the up-down direction. The front grill 153 made of resin is attached to the bumper fascia 151 to cover the opening 151*a*. The bumper reinforcement 140 is arranged on the rear side of the front grill 153. The front grill 153 is easily retractable at collision with, for example, a pedestrian.

The decorative member 152 is attached to the bumper fascia 1511. The decorative member 152 is a member for decorating a front surface of the automobile 1 and may be provided with, for example, plating or may be colored in the same color as a body color or in a color different from the body color. In the present embodiment, the decorative member 152 is provided adjacent to a front surface of the vehicle and along a peripheral portion of the opening 151*a* of the bumper fascia 151. The decorative member 152 may be attached to the front grill 153.

The decorative member 152 includes a lower part 152*a* extending in the right-left direction along a lower edge portion of the opening 151*a*, a left part 152*b* extending obliquely upward from a left end portion of the lower part 152*a*, and a right part 152*c* extending obliquely upward from a right end portion of the lower part 152*a*. The left part 152*b* extends along a left edge portion of the opening 151*a* of the bumper fascia 151. The right part 152*c* extends along a right edge portion of the opening 151*a* of the bumper fascia 151.

The shape of the decorative member 152 is not limited to the above-described shape but may be constituted by the left part 152*b* and the right part 152*c* without the lower part 152*a* or may include an upper part extending in the right-left direction along an upper edge portion of the opening 151*a*. When including the upper part, the decorative member 152 has a frame shape. The left part 152*b* and the right part 152*c* may be tilted relative to the vertical line in a front view or may not be tilted. The left part 152*b* and the right part 152*c* may each have a bent shape or a curved shape in a front view. The dimensions of the left part 152*b* and the right part 152*c* in the up-down direction may be set as appropriate in accordance with the shape and size of the opening 151*a*. In the present example, the left part. 152*b* and the right part 152*c* are tilted such that the left part 152*b* and the right part 152*c* are farther apart from each other at a position farther on the upper side but are not limited thereto, and the left part 152*b* and the right part 152*c* may be parallel to each other or may be tilted such that the left part 152*b* and the right part 152*c* are closer to each other at a position farther on the upper side. When the dimension of the opening 151*a* in the up-down direction is long, the dimension of the decorative member 152 in the up-down direction may be long accordingly.

The decorative member 152 includes a left-side protrusion portion 152*d* protruding in the left direction from the left part 152*b*, and a right-side protrusion portion 152*e* protruding in the right direction from the right part 152*c*. The left-side protrusion portion 152*d* is formed such that the left-side protrusion portion 152*d* is positioned farther on the rear side at a position farther on the left side, and extends along a lower portion of the left-side headlight L. The right-side protrusion portion 152*e* is formed such that the right-side protrusion portion 152*e* is positioned farther on the rear side at a position farther on the right side, and extends along a lower portion of the right-side headlight L.

The left side of the left-side protrusion portion 152*d* extends on the rear side beyond the left side of the bumper reinforcement 140. The right side of the right part 152*c* extends on the rear side beyond the right side of the bumper reinforcement 140. Note that the left-side protrusion portion 152*d* and the right-side protrusion portion 152*e* may be provided as necessary and may be omitted.

As illustrated in FIG. 1, a front portion of the decorative member 152 protrudes on the front side from a front portion of the bumper fascia 151. Specifically, the shape of the decorative member 152 is set such that a right-left direction intermediate portion of the decorative member 152 is positioned on the front side of a right-left direction intermediate portion of the bumper fascia 151. Such a design that the decorative member 152 protrudes on the front side from the bumper fascia 151 is employed to meet a request for a design property of the vehicle.

As illustrated in FIG. 10, in a front view, a left end portion of the bumper reinforcement 140 is positioned on right side of the left part 152*b* of the decorative member 152, and a right end portion of the bumper reinforcement 140 is positioned on left side of the right part 152*c* of the decorative member 152. In the present embodiment, in a front view, the bumper reinforcement 140 is arranged between the left part 152*b* and the right part 152*c* of the decorative member 152, the left end portion of the bumper reinforcement 140 does not overlap with the left part 152*b* of the decorative member 152, and the right end portion of the bumper reinforcement 140 does not overlap with the right part 152*c* of the decorative member 152. Specifically, the disposition position and shape of the bumper reinforcement 140 are set such that the bumper reinforcement 140 is positioned inside the opening 151*a* of the bumper fascia 151 in a front view. For example, the bumper reinforcement 140 may be arranged such that the dimension of the bumper reinforcement 140 in the right-left direction is smaller than the dimension of separation between the left part 152b and the right part 152c in the right-left direction and a right-left direction intermediate portion of the bumper reinforcement 140 and a right-left direction intermediate portion of the opening 151a coincide with each other. Accordingly, for example, when an obstacle collides with the front bumper 150 from the front side and the decorative member 152 is about to be retracted, the decorative member 152 is unlikely to interfere with the bumper reinforcement 140, and thus retraction of the decorative member 152 is unlikely to be encumbered by the bumper reinforcement 140. As a result, an impact on the obstacle can be reduced and pedestrian protection performance can be improved, in particular.

In the present embodiment, the left-side crush can 53A is positioned on right side of the left part 152b of the decorative member 152, and the right-side crush can 53B is positioned on left side of the right part 152c of the decorative member 152. Specifically, the disposition positions and shapes of the left-side crush can 53A and the right-side crush can 53B are set such that the left-side crush can 53A and the right-side crush can 53B are positioned inside the opening 151a of the bumper fascia 151 in a front view. Accordingly, for example, when an obstacle collides with the front bumper 150 from the front side and the decorative member 152 is about to be retracted, the decorative member 152 is unlikely to interfere with the left-side crush can 53A and the right-side crush can 53B, and thus retraction of the decorative member 152 is unlikely to be encumbered by the left-side crush can 53A and the right-side crush can 53B.

A lower end portion of the bumper reinforcement 140 is positioned higher than the lower part 152a of the decorative member 152. With this configuration as well, the decorative member 152 is unlikely to interfere with the bumper reinforcement 140. Lower end portions of the left-side crush can 53A and the right-side crush can 53B are positioned higher than the lower part 152a of the decorative member 152. When the decorative member 152 includes an upper part, an upper end portion of the bumper reinforcement 140 can be positioned lower than the upper part of the decorative member 152, and upper end portions of the left-side crush can 53A and the right-side crush can 53B can be positioned lower than the upper part of the decorative member 152.

Cross Members of Vehicle-Body Front Portion

As illustrated in FIGS. 6 and 7, the upper-side cross member 160 arranged at a higher position than the bumper reinforcement 140, and a lower-side cross member 161 arranged at a lower position than the bumper reinforcement 140 are provided at the front portion of the vehicle-body front structure A. The upper-side cross member 160 and the lower-side cross member 161 extend in the right-left direction, and longitudinal cross-sections of the cross members 160 and 161, which are orthogonal to the longitudinal direction are set smaller than a cross-section of the bumper reinforcement 140 in the same direction. The upper-side cross member 160 and the lower-side cross member 161 are each curved such that a right-left direction central portion thereof is positioned farthest on the front side and the cross member is positioned farther on the rear side at positions farther on the left side and the right side from the right-left direction central portion. The upper-side cross member 160, and the lower-side cross member 161 are each formed of, for example, an extruded material.

An upper-left-portion support member 162 extending toward the front side is provided at an upper portion of the left-side front-wheel suspension support member 51A, and an upper-right-portion support member 163 extending toward the front side is provided at an upper portion of the right-side front-wheel suspension support member 51B. The upper-left-portion support member 162 and the upper-right-portion support member 163 are upper-side impact absorption members that support respective ones of both vehicle-width-direction sides of the upper-side cross member 160 and absorb an impact load in the front-rear direction. When receiving an impact load in the front-rear direction, the upper-left-portion support member 162 and the upper-right-portion support member 163 absorb the impact load through compressive deformation or bending deformation. The upper-left-portion support member 162 and the upper-right-portion support member 163 may be each provided with a part that triggers compressive deformation or a part that triggers bending deformation.

The upper-left-portion support member 162 is tilted relative to a central line of the vehicle in the front-rear direction such that the upper-left-portion support member 162 is positioned farther on the left side at a position farther on the front side. The upper-right-portion support member 163 is tilted relative to the central line of the vehicle in the front-rear direction such that the upper-right-portion support member 163 is positioned farther on the right side at a position farther on the front side. Accordingly, the upper-left-portion support member 162 and the upper-right-portion support member 163 are each positioned farther on a vehicle-width-direction outer side at a position farther on the front side, and thus the interval between the upper-left-portion support member 162 and the upper-right-portion support member 163 is larger at a position farther on the front side. The front sides of the upper-left-portion support member 162 and the upper-right-portion support member 163 are positioned on the vehicle-width-direction outer side of the left and right end portions, respectively, of the bumper reinforcement 140. The front sides of the upper-left-portion support member 162 and the upper-right-portion support member 163 are also positioned on the vehicle-width-direction outer side of the front sides of the left-side crush can 53A and the right-side crush can 53B, respectively. Note that the upper-left-portion support member 162 and the upper-right-portion support member 163 may extend in parallel to the central line of the vehicle in the front-rear direction.

The left side of the upper-side cross member 160 is fixed to a front portion of the upper-left-portion support member 162, and the right side of the upper-side cross member 160 is fixed to a front portion of the upper-right-portion support member 163. Accordingly, the front portion of the upper-left-portion support member 162 and the front portion of the upper-right-portion support member 163 are connected to each other through the upper-side cross member 160.

The left side of the upper-side cross member 160 extends on the left side of the front portion of the upper-left-portion support member 162, and the right side of the upper-side cross member 160 extends on the right side of the front portion of the upper-right-portion support member 163. Accordingly, the dimension of the upper-side cross member 160 in the right-left direction is longer than the dimension of the bumper reinforcement 140 in the right-left direction, the left side of the upper-side cross member 160 extends on the vehicle-width-direction outer side beyond the left side of the bumper reinforcement 140, and the right side of the upper-side cross member 160 extends on the vehicle-width-direction outer side beyond the right side of the bumper reinforcement 140.

The height of the upper-side cross member 160 may be optionally set in accordance with installation heights of the upper-left-portion support member 162 and the upper-right-portion support member 163. In the present embodiment, the installation heights of the upper-left-portion support member 162 and the upper-right-portion support member 163 are set such that the upper-side cross member 160 is positioned higher than the decorative member 152. The position of the upper-side cross member 160 in the front-rear direction may be optionally set in accordance with the dimensions of the upper-left-portion support member 162 and the upper-right-portion support member 163 in the front-rear direction. In the present embodiment, the dimensions of the upper-left-portion support member 162 and the upper-right-portion support member 163 in the front-rear direction are set such that the bumper reinforcement 140 is positioned on the front side of the upper-side cross member 160.

The left side of the upper-left-portion support member 162 of the upper-side cross member 160 is connected to the left-side crush can 53A through a left-side connection member 166. The right side of the upper-right-portion support member 163 of the upper-side cross member 160 is connected to the right-side crush can 53B through a right-side connection member 167. The left-side headlight L is fixed on the vehicle-width-direction outer side of the left-side connection member 166, and the right-side headlight L is fixed on the vehicle-width-direction outer side of the right-side connection member 167. The left-side connection member 166 and the right-side connection member 167 are positioned on the rear side of the bumper reinforcement 140.

A lower-left-portion support member 164 extending toward the front side is provided at a lower portion of the left-side front-wheel suspension support member 51A, and a lower-right-portion support member 165 extending toward the front side is provided at a lower portion of the right-side front-wheel suspension support member 51B. The lower-left-portion support member 164 and the lower-right-portion support member 165 are lower-side impact absorption members that support respective ones of both vehicle-width-direction sides of the lower-side cross member 161 and absorb an impact load in the front-rear direction. The lower-left-portion support member 164 and the lower-right-portion support member 165 may be configured similarly to the upper-left-portion support member 162 and the upper-right-portion support member 163.

The lower-left-portion support member 164 is tilted relative to the central line of the vehicle in the front-rear direction such that the lower-left-portion support member 164 is positioned farther on the left side at a position farther on the front side. The lower-right-portion support member 165 is tilted relative to the central line of the vehicle in the front-rear direction such that the lower-right-portion support member 165 is positioned farther on the right side at a position farther on the front side. Accordingly, the lower-left-portion support member 164 and the lower-right-portion support member 165 are each positioned farther on the vehicle-width-direction outer side at a position farther on the front side, and thus the interval between the lower-left-portion support member 164 and the lower-right-portion support member 165 is larger at a position farther on the front side. The front sides of the lower-left-portion support member 164 and the lower-right-portion support member 165 are positioned on the vehicle-width-direction outer side of the left and right end portions, respectively, of the bumper reinforcement 140. The front sides of the lower-left-portion support member 164 and the lower-right-portion support member 165 are positioned on the vehicle-width-direction outer side of the front sides of the left-side crush can 53A and the right-side crush can 53B, respectively. Note that the lower-left-portion support member 164 and the lower-right-portion support member 165 may extend in parallel to the central line of the vehicle in the front-rear direction.

The left side of the lower-side cross member 161 is fixed to a front portion of the lower-left-portion support member 164, and the right side of the lower-side cross member 161 is fixed to a front portion of the lower-right-portion support member 165. Accordingly, the front portion of the lower-left-portion support member 164 and the front portion of the lower-right-portion support member 165 are connected to each other through the lower-side cross member 161.

The left side of the lower-side cross member 161 extends on the left side beyond the front portion of the lower-left-portion support member 164, and the right side of the lower-side cross member 161 extends on the right side beyond the front portion of the lower-right-portion support member 165. Accordingly, the dimension of the lower-side cross member 161 in the right-left direction is longer than the dimension of the bumper reinforcement 140 in the right-left direction, the left side of the lower-side cross member 161 extends on the vehicle-width-direction outer side beyond the left side of the bumper reinforcement 140, and the right side of the lower-side cross member 161 extends on the vehicle-width-direction outer side beyond the right side of the bumper reinforcement 140.

The height of the lower-side cross member 161 may be optionally set in accordance with installation heights of the lower-left-portion support member 164 and the lower-right-portion support member 165. In the present embodiment, the installation heights of the lower-left-portion support member 164 and the lower-right-portion support member 165 are set such that the lower-side cross member 161 is positioned lower than the decorative member 152. The position of the lower-side cross member 161 in the front-rear direction may be optionally set in accordance with the dimensions of the lower-left-portion support member 164 and the lower-right-portion support member 165 in the front-rear direction. In the present embodiment, the dimensions of the lower-left-portion support member 164 and the lower-right-portion support member 165 in the front-rear direction are set such that a front portion of a right-left direction central portion of the lower-side cross member 161 is positioned on the front side of a front portion of a right-left direction central portion of the bumper reinforcement 140.

In the present embodiment, the upper-side cross member 160) and the lower-side cross member 161 are both arranged not overlapping with the decorative member 152 in a front view. Accordingly, for example, when an obstacle collides the front bumper 150 from the front side, the decorative member 152 is unlikely to interfere with the upper-side cross member 160 and the lower-side cross member 161, and thus retraction of the decorative member 152 is unlikely to be encumbered by the upper-side cross member 160 and the lower-side cross member 161. Accordingly, an impact on the obstacle can be reduced and pedestrian protection performance can be improved, in particular. Note that one of the upper-side cross member 160 and the lower-side cross member 161 may be arranged not overlapping with the decorative member 152 in a front view. In this case as well, pedestrian protection performance is improved.

The front portions of the upper-left-portion support member 162 and the upper-right-portion support member 163 are positioned on the vehicle-width-direction outer side of the front portions of the crush cans 53A and 53B, and also the upper-side cross member 160 extends on the vehicle-width-direction outer side beyond the bumper reinforcement 140, and thus, for example, an impact load at offset collision can be absorbed by the upper-left-portion support member 162, the upper-right-portion support member 163, and the upper-side cross member 160. Similarly, the front portions of the lower-left-portion support member 164 and the lower-right-portion support member 165 are positioned on the vehicle-width-direction outer side of the front portions of the crush cans 53A and 53B, and also, the lower-side cross member 161 extends on the vehicle-width-direction outer side beyond the bumper reinforcement 140, and thus, for example, an impact load at offset collision can be absorbed by the lower-left-portion support member 164, the lower-right-portion support member 165, and the lower-side cross member 161. Offset collision is a collision form that an obstacle collides in a predetermined range only on the left side or the right side of the vehicle.

Figure 12:
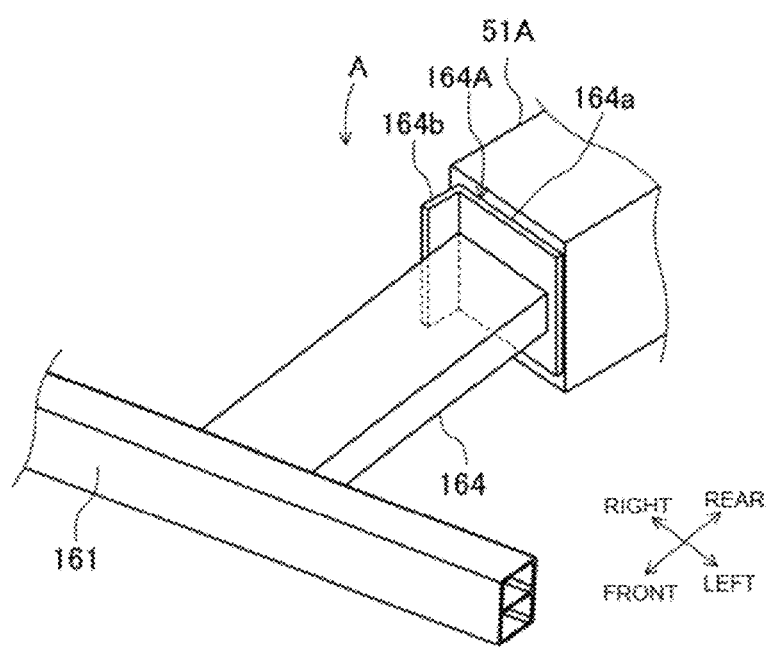
FIG. 12 is a perspective view illustrating a mounting structure of a lower-left-portion support member on a front-wheel suspension support member in an enlarged manner.

As illustrated in FIG. 12, the vehicle-body front structure A includes a rear-portion connecting portion 164A that connects the rear side of the lower-left-portion support member 164 to the lower portion of the left-side front-wheel suspension support member 51A. The rear-portion connecting portion 164A includes a body plate portion 164a interposed between the rear side of the lower-left-portion support member 164 and the lower portion of the front-wheel suspension support member 51A, and a reinforcement plate portion (reinforcement portion) 164b formed along a right-side wall portion of the lower-left-portion support member 164. The body plate portion 164a and the reinforcement plate portion 164b can be obtained by, for example, press-forming a plate material.

The body plate portion 164a is formed extending in the up-down direction and the right-left direction along the lower portion of the front-wheel suspension support member 51A and fixed to the front-wheel suspension support member 51A by a fastening member or the like. The dimension of the body plate portion 164a in the up-down direction is set to be longer than the dimension of the lower-left-portion support member 164 in the up-down direction, and the rear side of the lower-left-portion support member 164 is fixed to an up-down direction intermediate portion of the body plate portion 164a by welding or the like. A reinforcement portion formed along a left-side wall portion of the lower-left-portion support member 164 may be provided.

The reinforcement plate portion 164b protrudes on the front side from a right edge portion of the body plate portion 164a and extends in the up-down direction. The reinforcement plate portion 164b and the right-side wall portion of the lower-left-portion support member 164 may be joined to each other or may not be joined. When the reinforcement plate portion 164b is provided, inclination of the lower-left-portion support member 164 in the vehicle width direction, to which an impact load is applied, can be suppressed, and thus the lower-left-portion support member 164 can be deformed as desired to further increase an impact absorption effect.

Note that, as illustrated in FIGS. 6 and 7, the rear-portion connecting portion 165A that connects the rear side of the lower-right-portion support member 165 to the lower portion of the right-side front-wheel suspension support member 51B may be provided, and the rear-portion connecting portion 165A may be configured similarly to the rear-portion connecting portion 164A. A rear-portion connecting portion that connects the rear side of the upper-left-portion support member 162 to the upper portion of the left-side front-wheel suspension support member 51A may be provided, and the rear-portion connecting portion may be configured similarly to the rear-portion connecting portion 164A. A rear-portion connecting portion that connects the rear side of the upper-right-portion support member 163 to the upper portion of the right-side front-wheel suspension support member 51B may be provided, and the rear-portion connecting portion may be configured similarly to the rear-portion connecting portion 164A.

Detailed Structure of Crush Cans

As illustrated in FIG. 8, the left-side crush can 53A includes a rear-portion crush can 53a attached to the front portion of the left-side front-wheel suspension support member 51A and extending on the front side, and a front-portion crush can 53b attached to a front portion of the rear-portion crush can 53a and extending on the front side. The front portion of the rear-portion crush can 53a and a rear portion of the front-portion crush can 53b are connected and integrated. The rear-portion crush can 53a is formed to be less likely to be crushed when an impact load in the front-rear direction is applied than the front-portion crush can 53b. Specifically, the rear-portion crush can 53a is configured to maintain its shape until a first predetermined load is applied at front collision of the automobile 1 and perform compressive deformation when the first predetermined load is applied, and the front-portion crush can 53b is configured to maintain its shape until a second predetermined load smaller than the first predetermined load is applied at front collision of the automobile 1 and perform compressive deformation when the second predetermined load is applied. Thus, at light collision, only the front-portion crush can 53b crushes and deforms but the rear-portion crush can 53a does not crush and deform in some cases. Such a strength difference between the front-portion crush can 53b and the rear-portion crush can 53a is obtained by changing structure, plate thickness, material, or the like.

Note that the front-portion crush can 53b and the rear-portion crush can 53a both crush and deform when an impact load is so large at collision even classified as light collision that an impact load applied to the front-portion crush can 53b and the rear-portion crush can 53a exceeds the first predetermined load.

Similarly to the left-side crush can 53A, the right-side crush can 53B includes a rear-portion crush can 53c extending from the front portion of the right-side front-wheel suspension support member 51B to the front side, and a front-portion crush can 53d extending from a front portion of the rear-portion crush can 53c to the front side. A load at which the front-portion crush can 53d and the rear-portion crush can 53c start deforming is set similar to that of the front-portion crush can 53b and the rear-portion crush can 53a.

As illustrated in FIG. 7, a front portion BFa of the bonnet hood BF is positioned on the rear side of the front portions of the rear-portion crush cans 53a and 53c. Specifically, a fixation portion 168 for fixing the bonnet hood BF to the upper-side cross member 160 is arranged near the front portion BFa of the bonnet hood BE, and the fixation portion 168 is provided at the upper-side cross member 160.

The fixation portion 168 is configured to be switchable to a fixed state in which the bonnet hood BF is fixed to the upper-side cross member 160 and a canceled state in which the fixed state is canceled, and has been conventionally well known. A switching operation of the fixation portion 163 can be performed from the outside, and the fixation portion 168 can be switched from the fixed state to the canceled state, for example, when the user cancels lock of the fixation portion 168 through an operation of an operation lever provided in the occupant space R1 and then inserts the user's hand into a gap between the front portion BFa of the bonnet hood BF and the upper-side cross member 160 to operate the fixation portion 168. The fixation portion 168 is releasably attached to, for example, an engaging portion BF1 protruding from the front portion BFa of the bonnet hood BF to the lower side.

At light collision of the automobile 1, an impact load toward the rear side is applied to the bumper reinforcement 140 through the bumper fascia 151. The impact load applied to the bumper reinforcement 140 is applied to the left-side crush can 53A and the right-side crush can 53B. Since the front-portion crush cans 53b and 53d are configured to be crushed and deformed by a smaller impact load than the rear-portion crush cans 53a and 53c, the front-portion crush cans 53b and 53d are crushed and deformed before the rear-portion crush cans 53a and 53c are crushed and deformed. The impact load is absorbed as the front-portion crush cans 53b and 53d are crushed and deformed, and thus the rear-portion crush cans 53a and 53c are not crushed and deformed but remain in their original shapes or shapes close to the original shapes, depending on the magnitude of the impact load, in some cases. In such a case, since the front portion BFa of the bonnet hood BF is positioned on the rear side of the front portions of the rear-portion crush cans 53a and 53c, the impact load is hardly input to the front portion BFa of the bonnet hood BF.

The lower-left-portion support member 164 and the Lower-right-portion support member 165 supporting the lower-side cross member 161 extend on the front side beyond the front portion BFa of the bonnet hood BF. Accordingly, the front portions of the lower-left-portion support member 164 and the lower-right-portion support member 165 are arranged on the front side of the front portion BFa of the bonnet hood BF, and as a result, the lower-side cross member 161 is arranged on the front side of the front portion BFa of the bonnet hood BF, as well. Since such an arrangement is employed, an impact load at light collision can be absorbed by the lower-left-portion support member 164 and the lower-right-portion support member 165 as well, and thus the effect of suppressing damage on the bonnet hood BF further increases.

As illustrated in FIG. 10, a left-side portion BF2 of the front portion BFa of the bonnet hood BF is formed such that the left-side portion BF2 is positioned farther on the rear side at a position closer to the left end. A right-side portion BF3 of the front portion BFa of the bonnet hood BF is formed such that the right-side portion BF3 is positioned farther on the rear side at a position closer to the right end. An intermediate portion BF4 between the left-side portion BF2 and the right-side portion BF3 of the front portion BFa of the bonnet hood BF is formed extending in the vehicle width direction. In other words, the front portion BFa of the bonnet hood BF is formed such that the intermediate portion BF4 is positioned farthest on the front side and the left-side portion BF2 and the right-side portion BF3 are positioned farther on the rear side at a position farther on the vehicle-width-direction outer side.

The pair of right and left rear-portion crush cans 53a and 53c are positioned directly below the intermediate portion BF4 of the bonnet hood BF. Specifically, as described above, when the left-side portion BF2 and the right-side portion BF3 of the front portion BFa of the bonnet hood BF are formed in accordance with, for example, a request on design of the automobile 1 such that the left-side portion BF2 and the right-side portion BF3 are each positioned farther on the rear side at a position farther on the vehicle-width-direction outer side, an obstacle at light collision is unlikely to collide with the left-side portion BF2 and the right-side portion BF3 of the front portion BFa of the bonnet hood BF. However, since the intermediate portion BF4 of the bonnet hood BF extends in the vehicle width direction, an obstacle at light collision is likely to collide with the intermediate portion BF4. In the present embodiment, since the pair of right and left rear-portion crush cans 53a and 53c can be arranged corresponding to the intermediate portion BF4 of the bonnet hood BF, an obstacle at light collision is unlikely to collide with the intermediate portion BF4 of the bonnet hood BF.

The lower-left-portion support member 164 and the lower-right-portion support member 165 supporting the lower-side cross member 161, and the upper-left-portion support member 162 and the upper-right-portion support member 163 supporting the upper-side cross member 160 are positioned directly below the intermediate portion BF4 of the bonnet hood BF. Specifically, since the support members 162, 163, 164, and 165 can be arranged corresponding to the intermediate portion BF4 of the bonnet hood BF, an obstacle at light collision is unlikely to collide with the intermediate portion BF4 of the bonnet hood BF.

Working Effects of Embodiment

As described above, according to the present embodiment, for example, when an obstacle obliquely collides with the left side from the front side while the automobile 1 is traveling, an impact load obliquely toward the rear side of the vehicle is applied to the left side of the upper-side cross member 160 and the left side of the lower-side cross member 161. Since the upper-side cross member 160 is supported by the upper-left-portion support member 162 and the upper-right-portion support member 163 and the lower-side cross member 161 is supported by the lower-left-portion support member 164 and the lower-right-portion support member 165, the impact load is dispersively input to the upper-left-portion support member 162 and the lower-left-portion support member 164 positioned on the left side. In this case, since the upper-left-portion support member 162 and the lower-left-portion support member 164 are each positioned farther on the left side at a position farther on the front side, the direction of the impact load obliquely from the front-left side substantially matches with the direction in which the upper-left-portion support member 162 and the lower-left-portion support member 164 extend. Accordingly, the impact load can be reliably received by the upper-left-portion support member 162 and the lower-left-portion support member 164, and the impact load can be efficiently absorbed through deformation of the upper-left-portion support member 162 and the lower-left-portion support member 164. This is same for the right side.

Moreover, the crush cans 53A and 53B, the upper-left-portion support member 162 and the upper-right-portion support member 163, and the lower-left-portion support member 164 and the lower-right-portion support member 165 are separated from each other in the up-down direction, and thus, when an impact load is applied to the crush cans 53A and 53B, the upper-left-portion support member 162 and the upper-right-portion support member 163, and the lower-left-portion support member 164 and the lower-right-portion support member. 1.65, the impact load can be dispersed to a plurality of places separated in the up-down direction and the impact load can be avoided from being locally applied.

Furthermore, an impact load applied to the lower-left-portion support member 164 and the lower-right-portion support member 165 is transferred from the front-wheel suspension support members 51A and 51B to the front-side member 13 of the battery unit Y having a high strength, and the impact load can be absorbed by the front-side member 13 as well. An impact load applied to the upper-left-portion support member 162 and the upper-right-portion support member 163 can be absorbed by the vehicle-body structure above the occupant-space-side floor panel 41. Thus, an impact load applied at collision can be dispersed to the upper and lower sides of the vehicle body, and accordingly, deformation of a vehicle cabin is suppressed.

The above-described embodiment is merely exemplary in any aspects and not to be interpreted in a restrictive manner. Furthermore, modifications and changes belonging to a scope equivalent to the claims are all included in the scope of the present disclosure.

INDUSTRIAL APPLICABILITY

As described above, a vehicle-body front structure according to the present disclosure is applicable to, for example, an electric vehicle and other automobiles.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 31 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The scope of the invention is indicated by the appended claims, rather than the foregoing description.

What is claimed is:

1. A vehicle-body front structure of an automobile including a bumper reinforcement extending in a vehicle width direction, the vehicle-body front structure, comprising:
    an upper-side cross member extending in the vehicle width direction on an upper side of the bumper reinforcement;
    a lower-side cross member extending in the vehicle width direction on a lower side of the bumper reinforcement;
    upper-side impact absorption members that each support one of both vehicle-width-direction sides of the upper-side cross member and absorb an impact load in a vehicle front-rear direction; and
    lower-side impact absorption members that each support one of both vehicle-width-direction sides of the lower-side cross member and absorb an impact load in the vehicle front-rear direction, wherein
    the upper-side impact absorption members and the lower-side impact absorption members are each positioned farther on a vehicle-width-direction outer side at a position farther on a vehicle front side.

2. The vehicle-body front structure according to claim 1, further comprising:
    a rear-portion connecting portion that connects vehicle rear sides of at least either of the upper-side impact absorption members and the lower-side impact absorption members to a vehicle-body side member, wherein
    the rear-portion connecting portion includes a reinforcement portion formed along a sidewall portion of the impact absorption member on one vehicle-width-direction side.

3. The vehicle-body front structure according to claim 2, wherein
    the upper-side cross member and the lower-side cross member extend further on the vehicle-width-direction outer side than the bumper reinforcement, and
    vehicle front sides of the upper-side impact absorption members and the lower-side impact absorption members are positioned farther on the vehicle-width-direction outer side than the bumper reinforcement.

4. The vehicle-body front structure according to claim 3, further comprising:
    crush cans that each support one of both vehicle-width-direction sides of the bumper reinforcement, wherein
    vehicle front sides of the upper-side impact absorption members and the lower-side impact absorption members are positioned on the vehicle-width-direction outer side of vehicle front sides of the crush cans.

5. The vehicle-body front structure according to claim 4, wherein
    vehicle rear sides of the crush cans are separated downward from vehicle rear sides of the upper-side impact absorption members, and
    vehicle rear sides of the lower-side impact absorption members are separated downward from the vehicle rear sides of the crush cans.

6. The vehicle-body front structure according to claim 5, further comprising:
    a traveling motor;
    a battery that is disposed below a floor panel of the automobile and supplies electric power to the traveling motor; and
    a vehicle-body side member to which vehicle rear sides of the lower-side impact absorption members are connected, wherein
    a battery member extending in the vehicle width direction is provided at a vehicle front portion of the battery, and
    the vehicle-body side member is connected to the battery member.

7. The vehicle-body front structure according to claim 1, wherein the upper-side cross member and the lower-side cross member extend further on the vehicle-width-direction outer side than the bumper reinforcement, and vehicle front sides of the upper-side impact absorption members and the lower-side impact absorption members are positioned farther on the vehicle-width-direction outer side than the bumper reinforcement.

8. The vehicle-body front structure according to claim 1, further comprising:

a traveling motor;

a battery that is disposed below a floor panel of the automobile and supplies electric power to the traveling motor; and a vehicle-body side member to which vehicle rear sides of the lower-side impact absorption members are connected, wherein a battery member extending in the vehicle width direction is provided at a vehicle front portion of the battery, and the vehicle-body side member is connected to the battery member.

9. The vehicle-body front structure according to claim 2, further comprising:

a traveling motor;

a battery that is disposed below a floor panel of the automobile and supplies electric power to the traveling motor; and a vehicle-body side member to which vehicle rear sides of the lower-side impact absorption members are connected, wherein a battery member extending in the vehicle width direction is provided at a vehicle front portion of the battery, and the vehicle-body side member is connected to the battery member.

10. The vehicle-body front structure according to claim 3, further comprising:

a traveling motor;

a battery that is disposed below a floor panel of the automobile and supplies electric power to the traveling motor; and a vehicle-body side member to which vehicle rear sides of the lower-side impact absorption members are connected, wherein a battery member extending in the vehicle width direction is provided at a vehicle front portion of the battery, and the vehicle-body side member is connected to the battery member.

11. The vehicle-body front structure according to claim 4, further comprising:

a traveling motor;

a battery that is disposed below a floor panel of the automobile and supplies electric power to the traveling motor; and a vehicle-body side member to which vehicle rear sides of the lower-side impact absorption members are connected, wherein a battery member extending in the vehicle width direction is provided at a vehicle front portion of the battery, and the vehicle-body side member is connected to the battery member.

\* \* \* \* \*